United States Patent
Nakagiri et al.

(10) Patent No.: US 6,924,826 B1
(45) Date of Patent: Aug. 2, 2005

(54) INFORMATION PROCESSING APPARATUS, INFORMATION PROCESSING METHOD, AND STORAGE MEDIUM STORING COMPUTER-READABLE PROGRAM

(75) Inventors: Koji Nakagiri, Kanagawa (JP); Satoshi Nishikawa, Kanagawa (JP); Yasuo Mori, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 445 days.

(21) Appl. No.: 09/698,254

(22) Filed: Oct. 30, 2000

(30) Foreign Application Priority Data

Nov. 2, 1999 (JP) .......................................... 11/312626

(51) Int. Cl.⁷ ................................................ G09G 5/00
(52) U.S. Cl. ...................... 345/700; 715/527; 358/1.15; 399/81; 399/82; 399/83; 399/84; 399/85; 399/86; 399/87
(58) Field of Search ...................... 345/700; 358/1.15; 399/81–89; 715/527

(56) References Cited

U.S. PATENT DOCUMENTS

| | | | | |
|---|---|---|---|---|
| 5,799,206 A | * | 8/1998 | Kitagawa et al. | 710/36 |
| 6,417,931 B2 | | 7/2002 | Mori et al. | 358/1.15 |
| 6,452,692 B1 | * | 9/2002 | Yacoub | 358/1.15 |
| 6,476,927 B1 | * | 11/2002 | Schwarz, Jr. | 358/1.15 |
| 6,509,974 B1 | * | 1/2003 | Hansen | 358/1.12 |
| 2001/0024291 A1 | | 9/2001 | Mori et al. | 358/1.12 |
| 2001/0043359 A1 | | 11/2001 | Mori et al. | 358/1.15 |

FOREIGN PATENT DOCUMENTS

| | | | |
|---|---|---|---|
| JP | 10-105349 | 4/1998 | ............ G06F/3/12 |
| JP | 11-99724 | 4/1999 | ............ B41J/21/00 |
| JP | 11-179993 | 7/1999 | ............ B41J/21/00 |

* cited by examiner

Primary Examiner—Kristine Kincaid
Assistant Examiner—Le V Nguyen
(74) Attorney, Agent, or Firm—Fitzpatrick, Cella, Harper & Scinto

(57) ABSTRACT

Editing a printing job of printing data temporarily stored in an intermediate-code format is restricted such that an error does not occur in the result of printing. A user interface for editing the printing-setting information of the data temporarily stored in the intermediate-code format is controlled such that a change of printing settings which can be edited is restricted and the printing settings are displayed.

25 Claims, 24 Drawing Sheets

```
API GetLayout Info (iMode, pDevMode, pInfo)
    iMode :    SPECIFY PROCESSING MODE
               1 : LAYOUT PROCESSING AT HOST
               2 : LAYOUT PROCESSING AT PRINTER
    pDevmode : POINTER TO PRINTING SETTING INFORMATION
    pInfo :    POINTER TO LAYOUT INFORMATION
```

INFORMATION PROCESSING APPARATUS, INFORMATION PROCESSING METHOD, AND STORAGE MEDIUM STORING COMPUTER-READABLE PROGRAM

BACKGROUND OF THE INVENTION

1. Field of the Invention

The present invention relates to printing setting methods, printing setting apparatuses, and media, for printing jobs, and more particularly, to an information processing apparatus, an information processing method, a storage medium storing a program, and a computer-readable program which allow a printing preview to be displayed with the printing settings of documentation data generated by an application program being taken into account.

2. Description of the Related Art

Conventionally, when a document (document data) generated by an application program is printed, a set of printing setting attributes formed of a plurality of printing setting items specified by a printer driver in advance is generally defined for a printing job for the document.

Software having a "collective printing" function has been known, in which documentation data which an application program instructs to print is not output to a printer but is stored in a client and a plurality of stored documentation data is collectively sent to the printer as one job.

When the user wants to collectively execute a plurality of printing jobs generated, for example, by an application program A suited to generate texts, an application program B suited to generate tables, and an application program C suited to generate drawings, the user needs to spool pages to be output and feels inconvenient because the "collective printing" function just combines a plurality of printing jobs into one printing job, collective printing is specified, and data is printed in the order in which the data is spooled for collective printing. When a material formed of a text, a drawing, a text, a table, and a text each having one page is to be printed, for example, it is necessary that a first page be generated by the application program A and spooled, a second page be generated by the application program B and spooled, a third page be generated again by the application program A and spooled, a fourth page be generated by the application program C and spooled, and a fifth page be generated by the application program A and spooled.

When data to be collectively printed is previewed, a preview provided by each application program can be seen, but a preview having a plurality of printing settings specified by a printer driver cannot be seen. In addition, even when the printer driver provides a preview, if a plurality of printing settings defined in a plurality of printing jobs differ in a case when the plurality of printing jobs are collectively executed, a preview cannot be performed.

Furthermore, when a plurality of files are to be printed in one job, if the user wants to specify finishing for the combined job, there is no way to specify it and there is no preview function therefor. How the files are printed by a printing apparatus cannot be understood before printing.

To solve the foregoing drawbacks, it can be considered that a way to further edit the printing setting attributes of a printing job once spooled is provided. When the user interface (UI) of the printer driver of an output printer is used, it is effective since all the functions of the printer can be specified.

When a printing job once generated is held as intermediate data, and the printing setting attributes of the printing job are edited, however, unlike each-document settings, changes of some setting items may need to be restricted. When a printing job is converted to an intermediate code and a setting related to printing quality is changed in the intermediate data, for example, printing quality may deteriorate because a graphic engine outputs bit-map data having a format depending on a device according to an application program in some cases. In such a case, a change of the setting related to printing quality should be restricted. When the user interface of the printer driver is used, a change of the printing-quality setting cannot be restricted.

When a plurality of jobs for a plurality of documents are combined into one job, since a printing setting for the combined job needs to be changed while the printing setting attributes specified for each job need to be enabled, the user interface of the printer driver cannot be used. When a one-page-printing (when N pages are compressed, arranged, and printed in one physical page, it is called N-page printing, N-up, or Nin 1) job and a two-page-printing job are combined, for example, it is difficult for the user interface of the printer driver to specify stapling of pages with each job layout being maintained.

SUMMARY OF THE INVENTION

The present invention has been made to solve the foregoing drawbacks. Accordingly, it is an object of the present invention to change a printing setting for a combined job while the printing setting attribute specified for each job is made enabled. Another object of the present invention is to provide a way to change a printing setting by using the user interface (UI) of a printer driver even when a plurality of jobs are combined into one job. Still another object of the present invention is to restrict a change of a printing-quality setting when the printing settings of a combined job are changed. Yet another object of the present invention is to restrict a change of a layout setting when the settings of a combined job are changed.

One of the foregoing objects is achieved in one aspect of the present invention through the provision of an information processing apparatus for generating printing data to be transmitted to a printing apparatus, including spool means for temporarily storing data to be printed, generated by an application program, in an intermediate-code format; setting-information obtaining means for obtaining printing-setting information from the data temporarily stored in the spool means in the intermediate-code format; display control means for controlling such that a user interface for editing the printing-setting information of the data temporarily stored in the intermediate-code format is displayed; and setting edit means for relating printing settings edited by the user interface to the data stored in the intermediate-code format and for temporarily storing them, wherein the display control means controls such that a change of printing settings which can be edited by the user interface is restricted and the printing settings are displayed.

One of the foregoing objects is achieved in another aspect of the present invention through the provision of an information processing method for generating printing data to be transmitted to a printing apparatus, including an intermediate-data conversion step of converting data to be printed, generated by an application program into data having an intermediate-code format to temporarily store it; a setting-information obtaining step of obtaining printing-setting information from the data temporarily stored in the intermediate-code format: a display control step of controlling such that a user interface for editing the printing-setting information of the data temporarily stored in the intermediate-code format is displayed; and a setting edit step of relating printing settings edited by the user interface to the data stored in the intermediate-code format and of temporarily storing them, wherein the display control step controls such that a change of printing settings which can be edited by the user interface is restricted and the printing settings are displayed.

One of the foregoing objects is achieved in still another aspect of the present invention through the provision of a computer-executable program for generating printing data to be transmitted to a printing apparatus, including an intermediate-data conversion program code of converting data to be printed, generated by an application program into data having an intermediate-code format to temporarily store it; a setting-information obtaining program code of obtaining printing-setting information from the data temporarily stored in the intermediate-code format; a display control program code of controlling such that a user interface for editing the printing-setting information of the data temporarily stored in the intermediate-code format is displayed; and a setting edit program code of relating printing settings edited by the user interface to the data stored in the intermediate-code format and of temporarily storing them, wherein the display control program code controls such that a change of printing settings which can be edited by the user interface is restricted and the printing settings are displayed.

One of the foregoing objects is achieved in yet another aspect of the present invention through the provision of a storage medium for storing a computer-readable program of generating printing data to be transmitted to a printing apparatus, the program including an intermediate-data conversion program code of converting data to be printed, generated by an application program into data having an intermediate-code format to temporarily store it; a setting-information obtaining program code of obtaining printing-setting information from the data temporarily stored in the intermediate-code format; a display control program code of controlling such that a user interface for editing the printing-setting information of the data temporarily stored in the intermediate-code format is displayed; and a setting edit program code of relating printing settings edited by the user interface to the data stored in the intermediate-code format and of temporarily storing them, wherein the display control program code controls such that a change of printing settings which can be edited by the user interface is restricted and the printing settings are displayed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
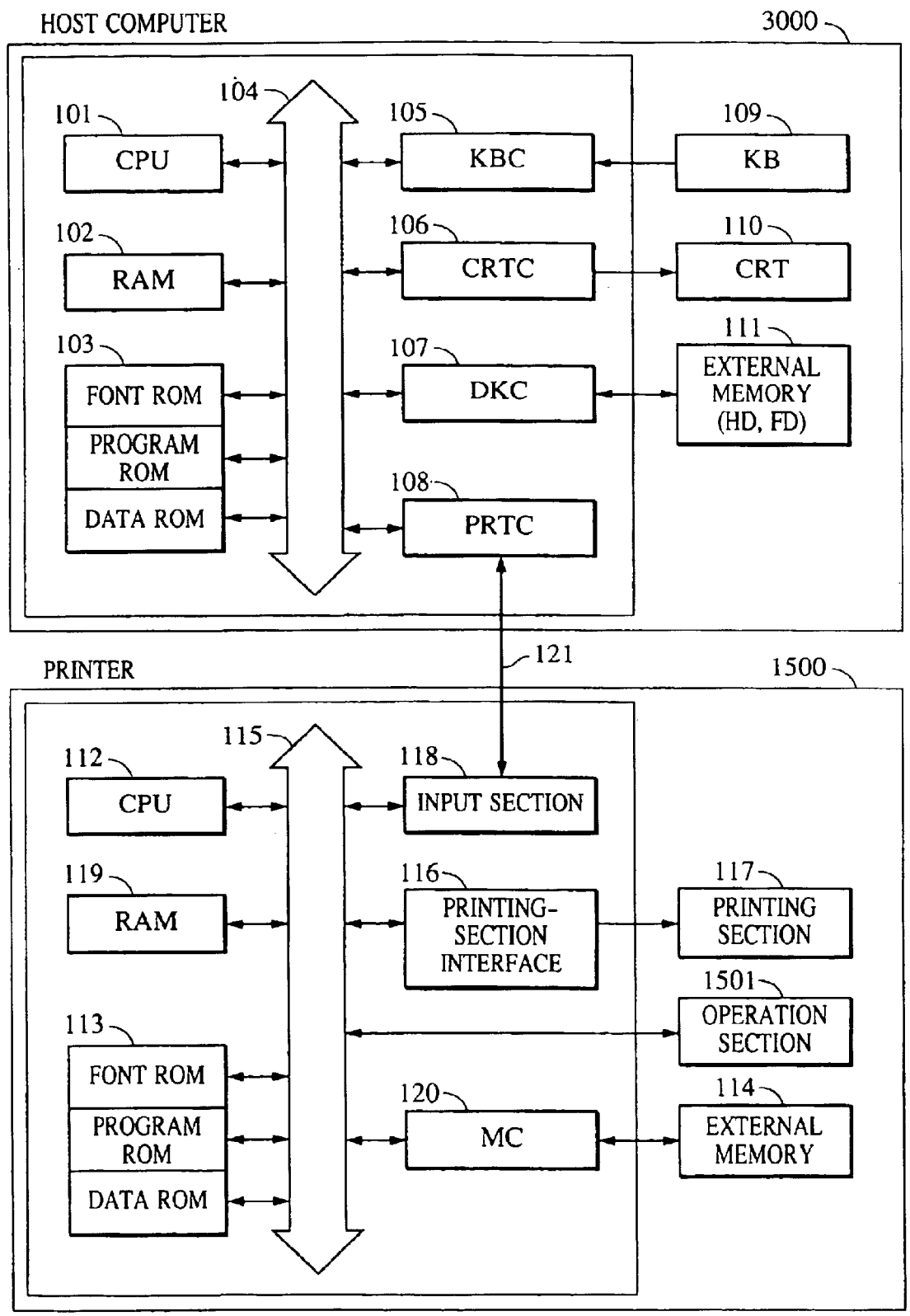
FIG. 1 is a block diagram showing the structure of a printing control apparatus according to an embodiment of the present invention.

A preferred embodiment of the present invention will be described below by referring to the drawings.

Before a processing flowchart according to an embodiment of the present invention is described, a system formed of a printer and an information processing apparatus, such as a personal computer, connected to the printer will be described. Especially, the information processing apparatus includes spool means for temporarily storing printing data in a data format (so-called intermediate code) different from that of printing data to be finally sent to the printer, before the printing data to be sent to the printer is generated, and also includes despool means for generating the printing data to be finally sent to the printer, from the data temporarily stored in the intermediate-code format, and means for generating printer control commands.

FIG. 1 is a block diagram showing the structure of a printer control system according to an embodiment of the present invention. When the functions of the present invention are implemented, the present invention can be applied to a single unit, to a system formed of a plurality of units, and also to a system executing processing with a connection through a network, such as a local area network (LAN) and a wide area network (WAN).

In FIG. 1, a host computer 3000 is provided with a central processing unit (CPU) 101 for executing document processing for documents having figures, images, characters, and tables (including table calculation), according to a document processing program stored in the program ROM of a ROM 103 or in an external memory 111. The CPU 101 controls each device connected to a system bus 104. An operating system program (hereinafter called an OS), which is the control program of the CPU 101, is stored in the program ROM of the ROM 103 or in the external memory 111. Font data used for the document processing is stored in the font ROM of the ROM 103 or in the external memory 111. Various types of data used in the document processing is stored in the data ROM of the ROM 103 or in the external memory 111. A RAM 102 serves as the main memory and work area of the CPU 101.

A keyboard controller (KBC) 105 controls key inputs sent from a keyboard 109 and a pointing device (not shown). A CRT controller (CRTC) 106 controls the display of a CRT display (CRT) 110. A disk controller (DKC) 107 controls access to the external memory 111, such as a hard disk (HD) and a floppy disk (FD), which stores a boot program, various application programs, font data, user files, edit files, and a printer-control-command generating program (hereinafter called a printer driver). A printer controller (PRTC) 108 is connected to a printer 1500 through a bi-directional interface 121 and executes communication control processing with the printer 1500.

The CPU 101 executes developing (rasterizing) processing of outlined fonts, for example, on a display information RAM specified on the RAM 102 to allow what-you-see-is-what-you-get (WYSIWYG) display on the CRT 110. The CPU 101 also opens various recorded windows according to commands specified by a mouse cursor (not shown) and executes various types of data processing. When the user executes printing, the user can open a window for printing settings to specify a printing processing method for a printer driver, such as printer settings and printing mode selection.

The printer 1500 is controlled by a printer CPU 112. The printer CPU 112 outputs an image signal serving as output information to a printing section (printer engine) 117 connected to a system bus 115, according to a control program stored in the program ROM of a ROM 113 or a control program stored in an external memory 114. The program ROM of the ROM 113 stores the control program of the printer CPU 112. Font data used to generate the output information is stored in the font ROM of the ROM 113. Information used in the host computer is stored in the data ROM of the ROM 113 when the printer is not provided with the external memory 114, such as a hard disk.

The printer CPU 112 can execute communication processing with the host computer through an input section 118 to report printer information to the host computer 3000. A RAM 119 functions as the main memory and the work area of the printer CPU 112, and its memory capacity can be extended by an optional RAM connected to an extension port (not shown). The RAM 119 is used for an output-information developing area and an environmental-data storage area, and serves as a non-volatile RAM (NVRAM). An access to the external memory 114, such as a hard disk or an IC card, is controlled by a memory controller (MC) 120. The external memory 114 is connected as an option, and stores font data, an emulation program, and form data. An operation section 1501 is provided with a switch and an LED display for operations.

As the external memory 114, not only one device but also a plurality of devices may be provided. A plurality of optional cards having external fonts may be connected to increase fonts in addition to the built-in fonts stored in the font ROM, or a plurality of external memories which store programs for interpreting different printer control languages may be connected. An NVRAM (not shown) may be provided to store printer-mode setting information sent from the operation section 1501.

Figure 2:
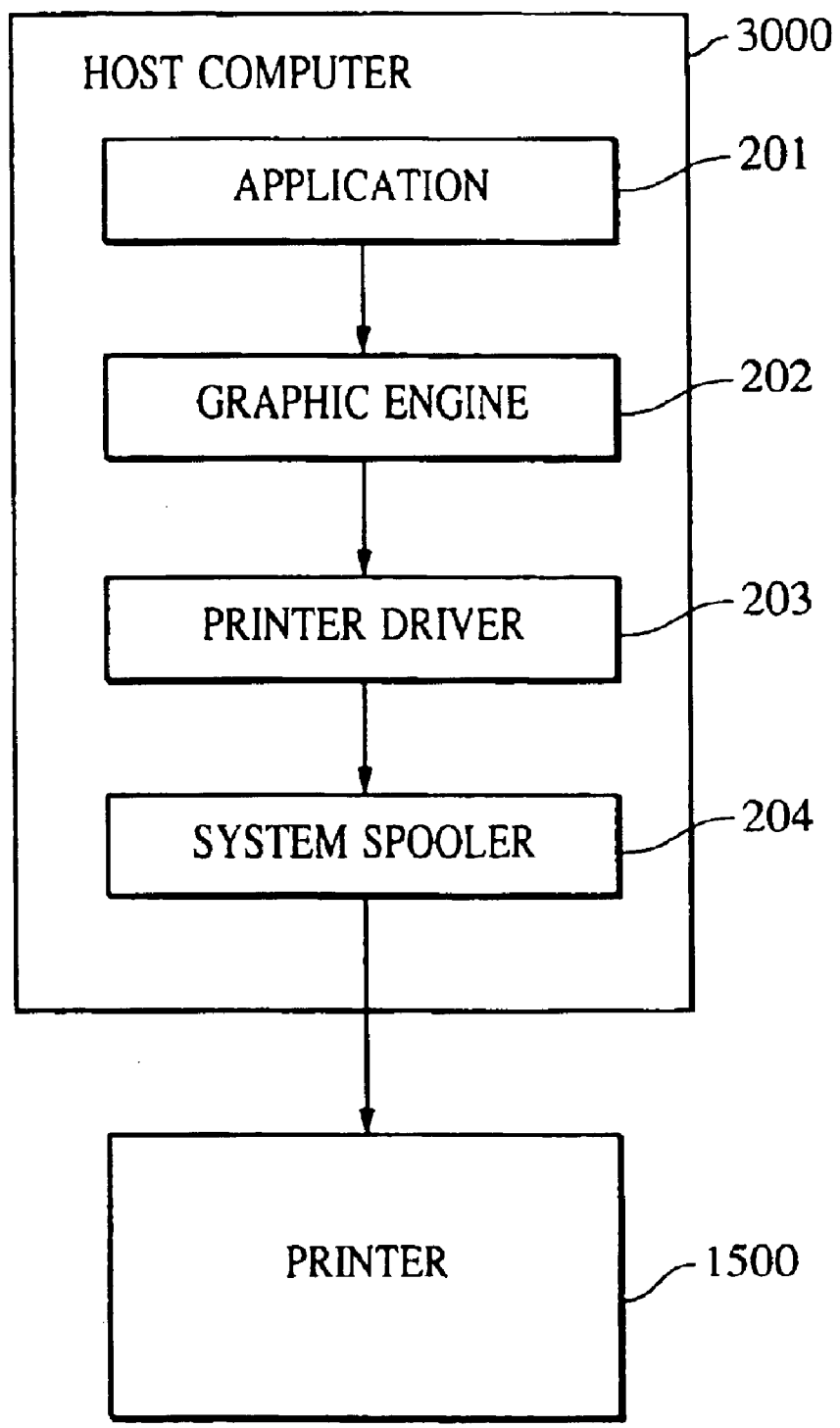
FIG. 2 is a block diagram showing a typical printing system of a host computer connected to a printer.

FIG. 2 shows a typical-printing-processing structure in the host computer directly connected to a printing apparatus, such as the printer, or connected thereto through a network. An application program 201, a graphic engine 202, a printer driver 203, and a system spooler 204 are files stored in the external memory 111, and serve as program modules loaded into the RAM 102 and executed by the OS and other modules using them. The application program 201 and the printer driver 203 can be externally installed into an FD serving as an external memory 111, a CD-ROM (not shown), or an HD serving as an external memory 111 through a network (not shown). The application program 201 stored in the external memory 111 is loaded into the RAM 102 and executed. When the application program 201 executes printing on the printer 1500, the application program 201 is loaded into the RAM 102 and uses the graphic engine 202 which is ready to output (draw) data.

The graphic engine 202 loads the printer driver 203 prepared for each printing apparatus, from the external memory 111 to the RAM 102, and sets the output destination of the application program 201 to the printer driver 203. The graphic engine 202 converts a graphic device interface (GDI) function received from the application program 201 to a device driver interface (DDI) function, and outputs the DDI function to the printer driver 203. The printer driver 203 converts the DDI function received from the graphic engine 202 to a printer-recognizable control command, such as a page description language (PDL). The converted printer control command is output to the printer 1500 via the interface 121 as printing data, through a system spooler 204 loaded into the RAM 102 by the OS.

Figure 3:
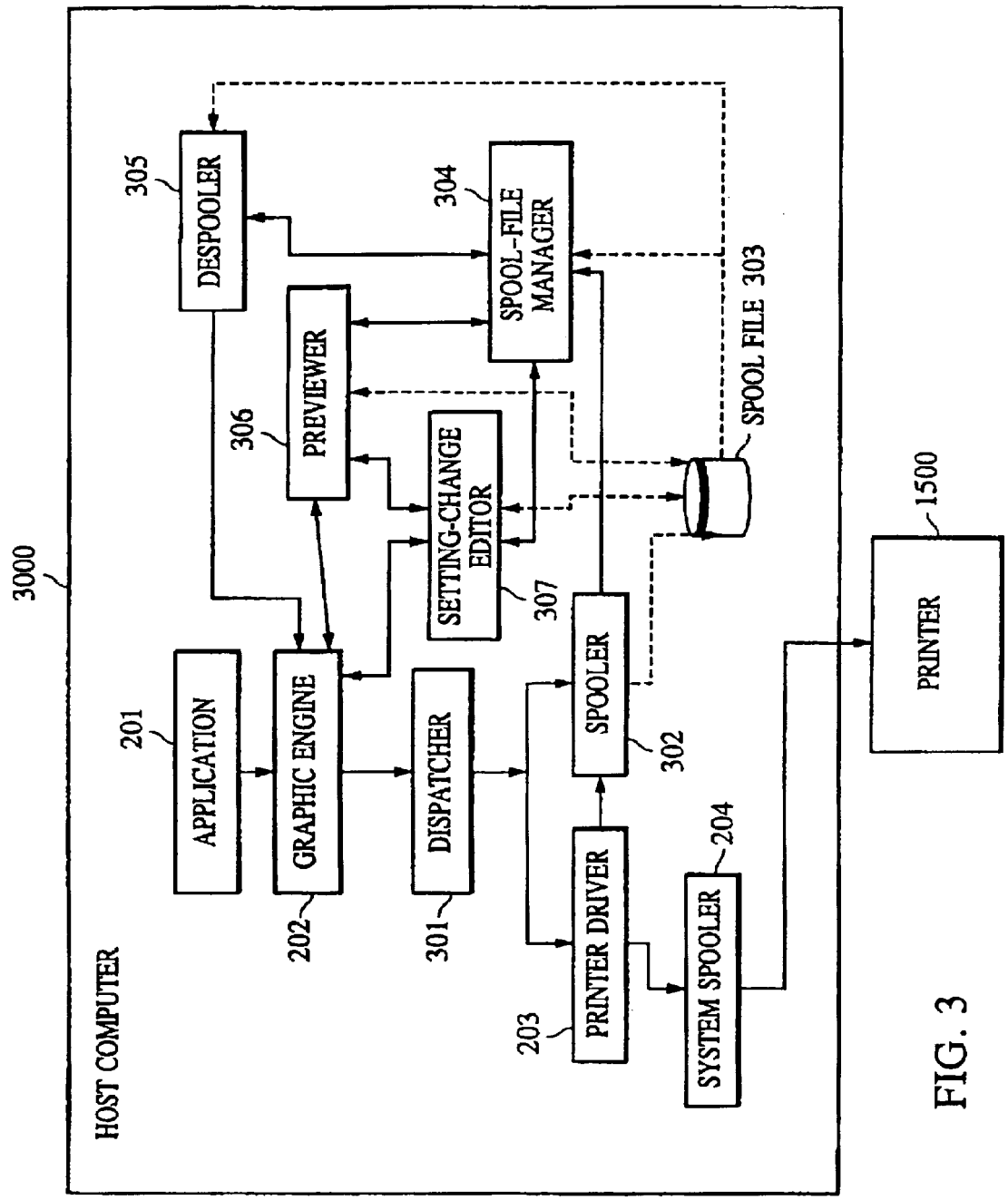
FIG. 3 is a block diagram showing the structure of a printing system in which a printing instruction sent from an application program is spooled in an intermediate-code format before it is converted to a printer control command.

The printer control system of the present embodiment includes a module for temporarily spooling the printing data sent from the application program as intermediate-code data, as shown in FIG. 3, in addition to the printing processing structure shown in FIG. 2 formed of the printer and the host computer.

The printing processing structure shown in FIG. 2 is extended to implement the printer control system shown in FIG. 3. When a printing instruction is sent from the graphic engine 202 to the printer driver 203, a spool file 303 formed of the intermediate code is temporarily generated. In the structure shown in FIG. 2, the application program 201 is released from printing processing when the printer driver 203 finishes converting all printing instructions sent from the graphic engine 202 to printer control commands. In contrast, in the system shown in FIG. 3, the application program 201 is released from printing processing when a spooler 302 converts all printing instructions to intermediate-code data and outputs it to the spool file 303. Usually, the latter takes a shorter time. In the system shown in FIG. 3, the contents of the spool file 303 can be manipulated. Therefore, a function which is not provided for the application program can be applied to printing data sent from the application program, such as compression and expansion, and compressing a plurality of pages into one page and printing it.

For the above-described purposes, the structure shown in FIG. 2 has been extended so as to spool printing data as intermediate-code data as shown in FIG. 3. To manipulate the printing data, a setting is executed on a window provided by the printer driver 203 and the setting is stored in the RAM 102 or in the external memory 111 by the printer driver 203.

Details shown in FIG. 3 will be described below. As shown in FIG. 3, in this extended processing method, the DDI function serving as a printing instruction sent from the graphic engine 202 is received by a dispatcher 301. When a printing instruction (DDI function) sent from the graphic engine 202 to the dispatcher 301 is based on a printing instruction (GDI function) issued from the application program 201 to the graphic engine 202, the dispatcher 301 loads the spooler 302 stored in the external memory 111 to the RAM 102, and sends the printing instruction (DDI function) not to the printer driver 203 but to the spooler 302.

The spooler 302 analyzes the received printing instruction, converts it in units of pages into the intermediate code, and outputs to the spool file 303. The intermediate-code spool file stored in units of pages is called a page description file (PDF). The spooler 302 obtains manipulation settings (such as Nup, both-sided printing, stapling, color/monochrome setting) related to printing data, specified for the printer driver 203, from the printer driver 203, and stores them as files in units of jobs in the spool file 303. These setting files stored in units of jobs are called job setting files (sometimes called spool description files (SDFs) in a simpler way). The job setting files will be described later. The spool file is generated as a file on the external memory 111, but may be generated on the RAM 102. In addition, the spooler 302 loads a spool-file manager 304 stored in the external memory 111 into the RAM 102, and reports the generation state of the spool file 303 to the spool-file manager 304. Then, the spool-file manager 304 determines whether printing is executed according to the contents of the manipulation settings related to printing data, stored in the spool file 303.

When the spool-file manager 304 determines that printing can be executed by using the graphic engine 202, the spool-file manager 304 loads a despooler 305 stored in the external memory 111 into the RAM 102, and instructs the despooler 305 to execute printing processing of the intermediate-code page description file written in the spool file 303.

The despooler 305 manipulates the intermediate-code page description file included in the spool file 303 according to job setting files which include the manipulation setting information included in the spool file 303, re-generates a GDI function, and outputs the GDI function again through the graphic engine 202.

When the printing instruction (DDI function) sent from the graphic engine 202 to the dispatcher 301 is based on the printing instruction (GDI function) issued from the despooler 305 to the graphic engine 202, the dispatcher 301 sends the printing instruction not to the spooler 302 but to the printer driver 203.

The printer driver 203 generates a printer control command written in a page description language, according to the DDI function obtained from the graphic engine 202, and outputs it to the printer 1500 through the system spooler 204.

In addition to the above-described extended system, a previewer 306 and a setting-change editor 307 are provided to allow a preview, a printing-setting change, and combining a plurality of jobs, in FIG. 3.

Figure 9:
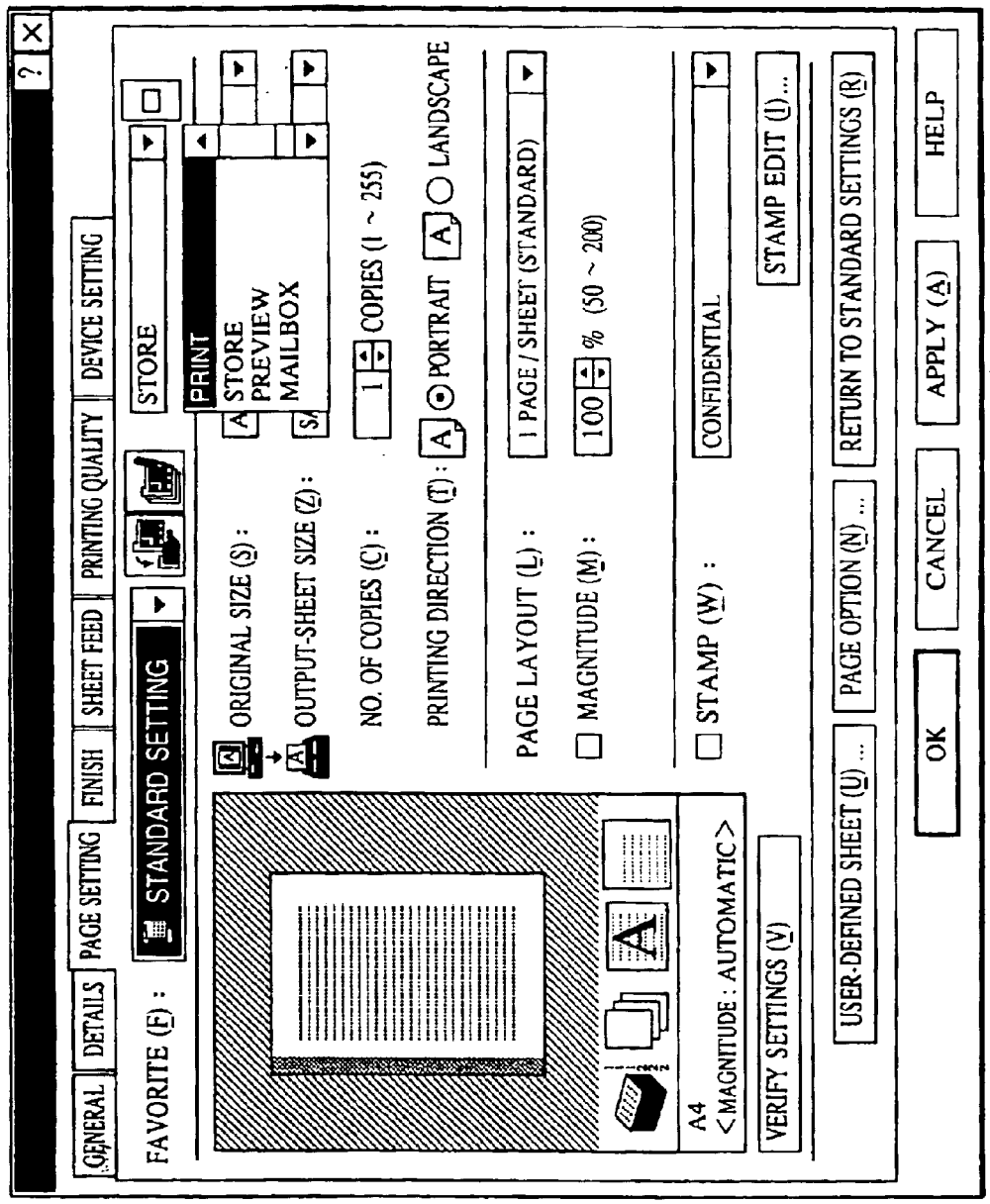
FIG. 9 shows an example of a printing-spool-setting screen.

To execute a preview, a printing setting change, or combining a plurality of jobs, the user needs to specify "store" in a pull-down menu serving as means for "specifying output destination" in the property of the printer driver shown in FIG. 9. To see just a preview, the user can select "preview" as the output destination.

Figure 16:
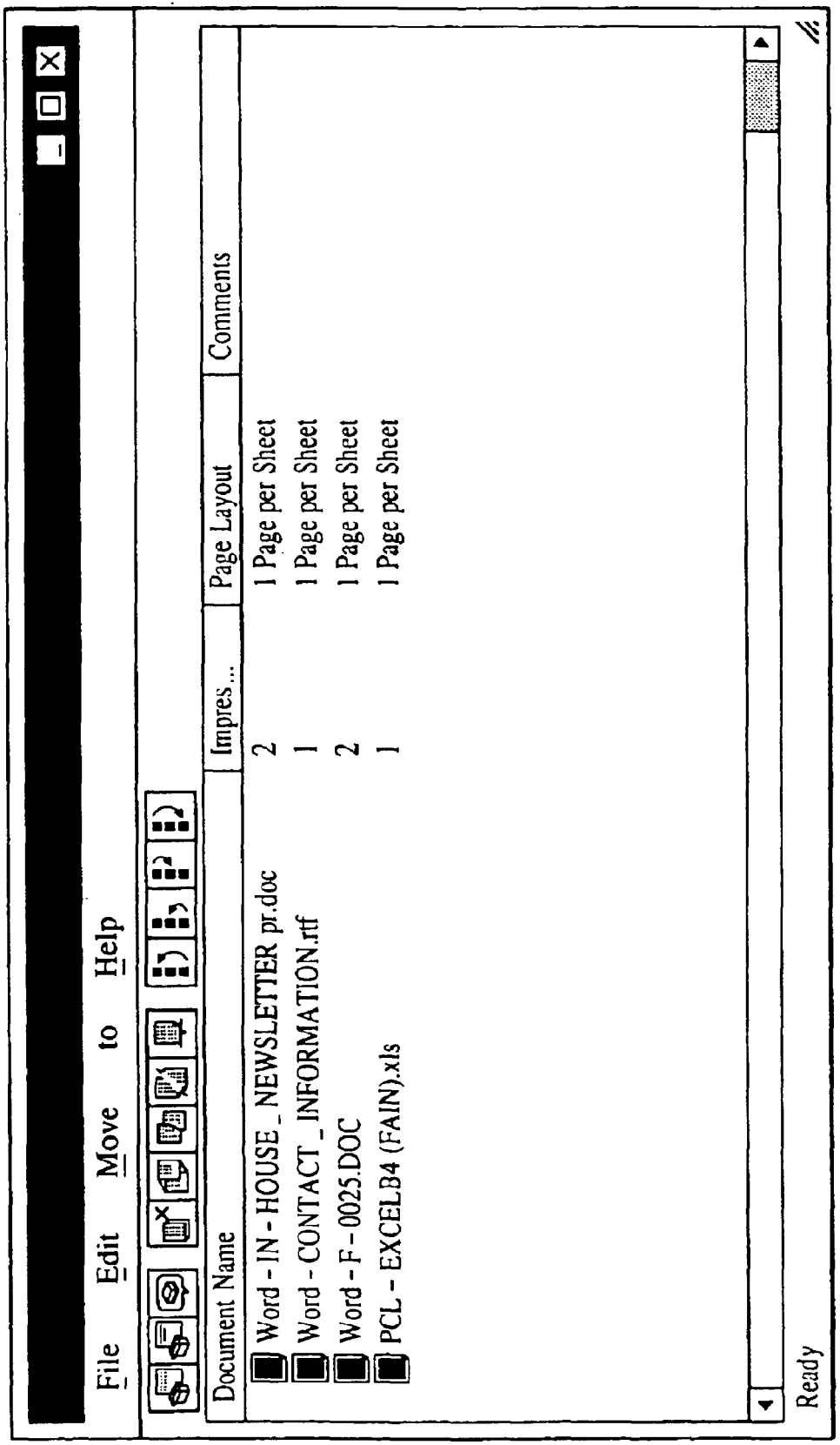
FIG. 16 shows an example screen for displaying the list of printing jobs spooled by the spool-file manager 304.

Items specified in the property of the printer driver are stored as a setting file in a structure member (called DEVMODE in the Windows OSs) which the OS provides. The structure member includes, for example, a setting of whether to store in the spool-file manager 304, in the manipulation settings included in the spool file 303. When the spool-file manager 304 reads the manipulation settings through the printer driver and "store" is specified, a page description file and a job setting file are generated and stored in the spool file 303, as described above, the window screen of the spool-file manager is popped up as shown in FIG. 16, and jobs spooled to the spool file 303 are listed. FIG. 16 shows an example in which four jobs are spooled. A job can be operated by pressing a menu bar or a menu icon immediately below the menu bar. The number of operations is the same between the menu bar and the menu icons. There are 11 types of operations: "print" for printing after a job is selected, "save and print" for executing printing while an intermediate-code spool file is left as is, "preview" for viewing the output preview of the job with printing settings taken into account, "delete" for deleting the intermediate-code spool file, "duplicate" for generating a copy of the intermediate-code spool file, "combine" for combining a plurality of intermediate-code spool-file jobs into one job, "divide" for dividing a combined job into the original plurality of jobs, "job edit" for changing the printing settings (such as layout settings and finishing settings) of a single job or a combined job, "move to top" for moving the printing order of a job to the top, "move forward by one step" for moving the printing order of a job forward by one step, "move backward by one step" for moving the printing order of a job backward by one step, and "move to last" for moving the printing order of a job to the last.

When the preview of a single job or a combined job is specified on the window screen (FIG. 16) of the spool-file manager, the previewer 306 stored in the external memory 111 is loaded into the RAM 102, and the previewer 306 is instructed to execute preview processing of the intermediate-code job written in the spool file 303.

The previewer 306 sequentially reads intermediate-code page description file (PDF) included in the spool file 303, manipulates the PDFs according to the contents of manipulation setting information included in the job setting file (SDF) stored in the spool file 303, outputs a GDI function to the graphic engine 202, and the graphic engine 202 outputs description data to its client area to make an output on the screen.

The graphic engine 202 performs appropriate rendering according to the specified output destination. Therefore, like the despooler 305, the previewer 306 manipulates the intermediate code included in the spool file 303 according to the contents of the manipulation settings included in the spool file 303 and uses the graphic engine 202 to output. The manipulation settings specified by the printer driver are stored in the spool file 303 as a job setting file and data in a page description file is manipulated and output according to the job setting file to allow how actual description data is printed to be shown to the user. In addition, when Nup (processing for compressing and arranging N logical pages into one physical page and printing it) is specified, when both-sided printing is specified, when booklet printing is specified, and when stamping is specified, a printing preview very close to the actual printing is shown to the user according to each condition. A preview function provided for a conventional application program for generating documents makes a preview according to the page settings on the application program. Therefore, the printing settings on the printer driver are not taken into account, and a preview very close to the actual printing cannot be shown to the user.

Figure 17:
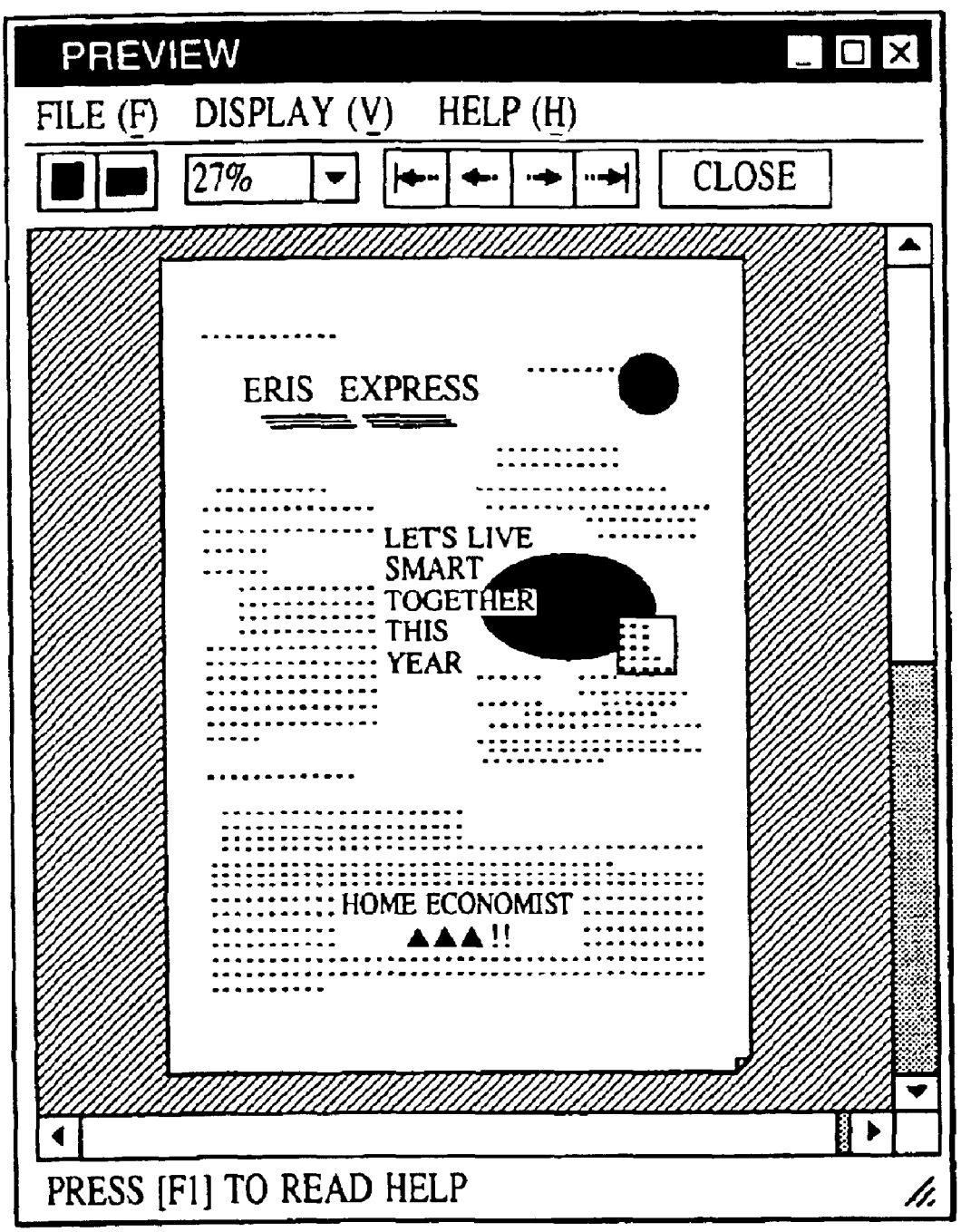
FIG. 17 shows an example screen of a previewer 306.

With the above-described preview processing, the previewer 306 displays a large preview having the printing manipulation settings included in the spool file 303 on the screen as shown in FIG. 17. Then, the user instructs the previewer 306 to close the preview and the control is transferred to the window screen (FIG. 16) of the spool-file manager.

When the user wants to execute printing according to the contents shown by the previewer 306, the user specifies "print" or "save and print" on the spool-file manager 304 to issue a printing request. As described before, in response to the printing request, the despooler 305 manipulates the page description file according to the job setting file to generate a GDI function, sends it to the graphic engine 202, a printing instruction is sent to the printer driver 203 through the dispatcher 301, and printing is executed.

A setting change executed by the setting-change editor 307 will be described next.

A setting change can be applied to a job for which "store" is specified in FIG. 9, like a preview. In the same flowchart, the spool-file manager 304 is popped up and spooled jobs are listed. On the window screen (FIG. 16) of the spool-file manager, when "job edit" is specified and a setting change is specified, the setting-change editor 307 stored in the external memory 111 is loaded into the RAM 102, and the setting-change editor 307 is instructed to display the current or the default manipulation settings. Then, a job-setting screen shown in FIG. 18 is displayed.

Figure 18:
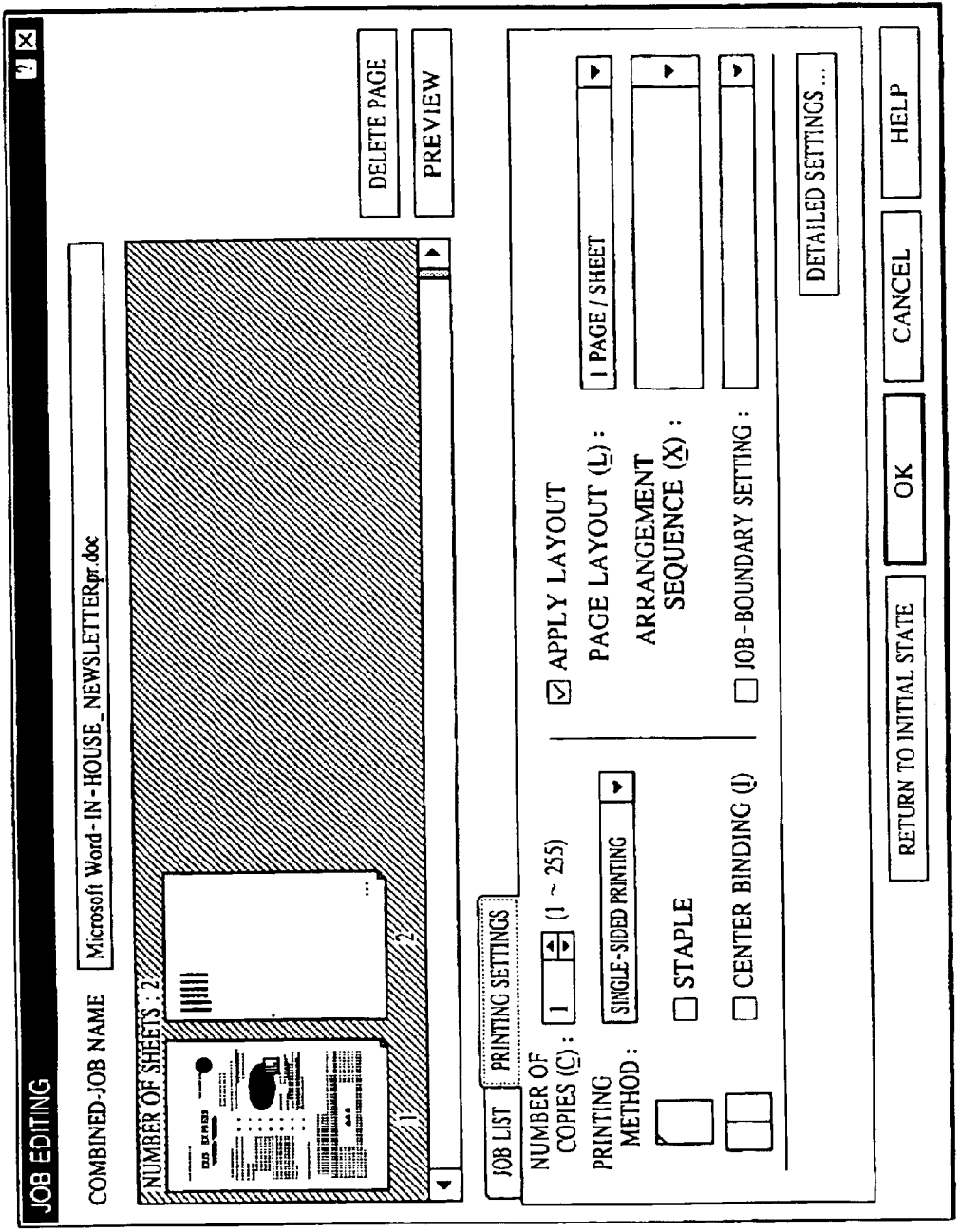
FIG. 18 shows an example screen of the setting-change editor 307.

The setting-change editor 307 obtains the job setting file of the job for which "job edit" is specified, from the spool file 303, and changes the default values on the job setting file screen shown in FIG. 18 according to the setting items specified in the job setting file. In the example shown in FIG. 18, the job setting file of the job for which "job edit" has been specified includes a number-of-copies setting of 1, a printing-method setting of single-sided printing, a staple setting of no staple, and a layout setting of 1 page/sheet.

The setting-change editor 307 can also output a small preview on the screen shown in FIG. 18 by manipulating the intermediate-code page description file included in the spool file 303 according to the contents of the manipulation settings included in the job setting file stored in the spool file 303 and by using the graphic engine 202 to output to its client area.

In addition, the contents of the manipulation settings included in the job setting file stored in the spool file 303 can be changed or corrected. The setting-change editor 307 may have items which the printer driver 203 can specify, on its user interface, or may call the user interface of the printer driver 203. As shown in FIG. 18, the number of copies, a printing method (single-sided printing, both-sided printing, or booklet printing), stapling (such as a saddle stitch), page layout, and an arrangement sequence can be specified. Most of the items which can be specified by the printer driver can be set again when "detailed settings" is pressed. Settings related to printing quality, such as a resolution and a graphic mode, are not allowed to be changed.

The setting-change editor 307 requests an approval of the changed items. When the changed items are approved, the control is transferred to the spool-file manager 304. The changed items of printing settings are stored not in the original job setting file, but a newly-generated job-output setting file used in job editing. Details of the job-output setting file will be described later by referring to FIG. 10.

When the user wants to execute printing according to the changed setting contents, the user issues a printing request on the spool-file manager 304, in the same way as for a confirmation on the previewer 306. The printing request is sent to the graphic engine 202, and a printing instruction is sent to the printer driver 203 through the dispatcher 301 to execute printing.

On the window screen (FIG. 16) of the spool-file manager, a plurality of printing jobs can be combined into one printing job and printed. This can be applied to jobs for each of which "store" has been specified at an output destination in the property of the printer driver shown in FIG. 9, in the same way as for the preview and setting change.

When the user wants to combine printing jobs, the user calls the printer driver 203 from the application program 201, and selects "store" on the user interface such as that shown in FIG. 9. As described above, with this selection, the page description file is stored in the spool file 303, and the window screen of the spool-file manager shown in FIG. 16 is popped up. Spooled jobs are listed on the window of the spool-file manager. The user performs the same operation in the application program 201 to list a plurality of jobs on the spool-file manager 304.

A plurality of jobs are selected and "combine" is specified, the setting-change editor 307 stored in the external memory 111 is loaded into the RAM 102, and the setting-change editor 307 is instructed to display the top job in the list or the default manipulation settings. Then, a combining setting screen shown in FIG. 18 is displayed. The setting-change editor 307 is used for the combining setting screen, but another module can be used.

The setting-change editor 307 outputs the jobs on the window by manipulating the intermediate-code page description file included in the spool file 303 according to the contents of the manipulation settings included in the job setting file stored in the spool file 303 and by using the graphic engine 202 to output all the jobs specified as the combined job to its client area. All the selected jobs can be previewed on a preview area shown in FIG. 18. When the combined job is generated, a job-output setting file obtained by extending the job setting file of each single job is also generated. A job-output setting file is also generated when job editing is executed. One job-output setting file is created for one single job. One job-output setting file is also created for one combined job.

Each job can be displayed with the manipulation settings specified before combining, or with the manipulation settings changed and corrected for the combined job. The setting-change editor 307 may have items which the printer driver 203 can specify, on its user interface, or may call the user interface of the printer driver 203.

The combined job and the changed items are approved according to an approval request from the setting-change editor 307, and the control is transferred to the spool-file manager 304. With these operations, the plurality of selected jobs are displayed on the window of the spool-file manager as one combined job.

When the user wants to print it according to the changed setting contents, as in a confirmation on the previewer 306, the user issues a printing request on the spool-file manager 304. The printing request is sent to the graphic engine 202, a printing instruction is sent to the printer driver 203 through the dispatcher 301, and printing is executed.

Figure 4:
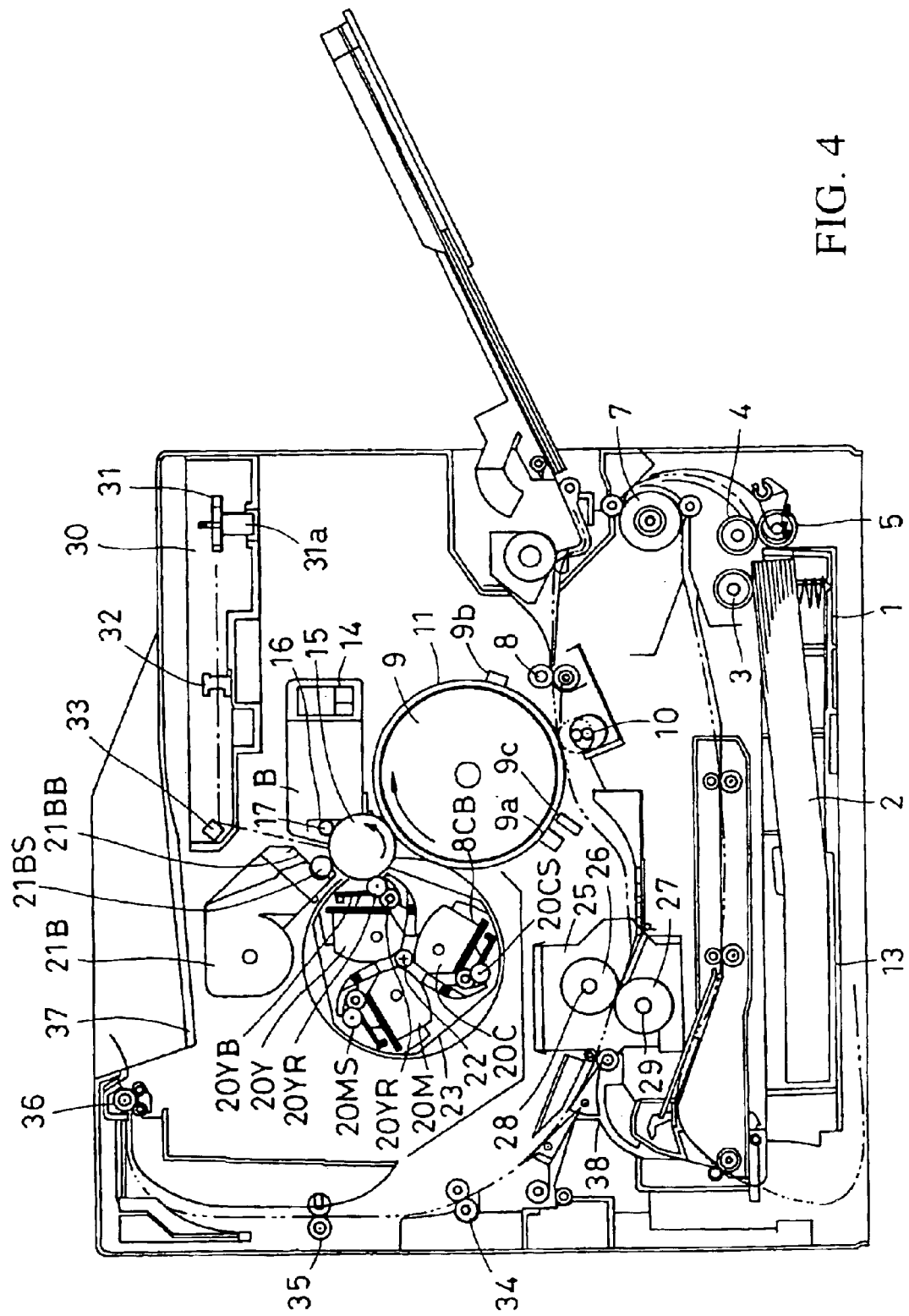
FIG. 4 is a view of a printer in the present invention.

FIG. 4 is a cross-sectional view of a color laser printer having a both-sided-printing function, serving as an example of the printer 1500.

This color laser printer scans a photosensitive drum 15 by a polygon mirror 31 with laser light modulated by image data of each color obtained according to printing data input from the host computer 3000 to generate an electrostatic latent image. The electrostatic latent image is toner-developed to obtain a visible image, and the image is multiple-transferred to an intermediate transfer member 9 for all colors to generate a visible color image. This visible color image is then transferred to a transfer member 2 to fix the visible color image on the transfer member 2. An image generation section which performs the above-described control is formed of a drum unit 13 having the photosensitive drum 15, a first charging section having a contact charging roller 17, a cleaning section, a developing section, the intermediate transfer member 9, a sheet feed section having a sheet cassette 1 and various rollers 3, 4, 5, and 7, a transfer section having a transfer roller 10, and a fixing section 25.

The drum unit 13 is formed of the photosensitive drum (photosensitive member) 15 and a cleaner container 14 having a cleaning mechanism, which also serves as the holder of the photosensitive drum 15, both of which being, integrated as a unit. The drum unit 13 is supported detachably from the printer and is easily replaceable when the life of the photosensitive drum 15 elapses. The photosensitive drum 15 is formed of an aluminum cylinder on which an organic photo-conductive layer is applied at the outer periphery, and is rotatably supported by the cleaner container 14. The photosensitive drum 15 is rotated by the transferred driving force of a driving motor (not shown). The driving motor rotates the photosensitive drum 15 counter-clockwise according to an image generation operation. The surface of the photosensitive drum 15 is selectively exposed to light to generate a latent image. A scanner section 30 reflects modulated laser light by a polygon mirror rotated by a motor 31a in synchronization with the horizontal synchronization signal of the image signal, and illuminates the photosensitive drum through a lens 32 and a reflection mirror 33.

The developing section is formed of three color developers 20Y, 20M, and 20C for development in yellow (Y), magenta (M), and cyan (C) and one black developer 21B for development in black (B) in order to make the electrostatic latent image into a visible image. The color developers 20Y, 20M, and 20C and the black developer 21B include sleeves 20YS, 20MS, 20CS, and 21BS, and application blades 20YB, 20MB, 20CB, and 21BB which contact by pressure with the outer peripheries of the sleeves 20YS, 20MS, 20CS, and 21BS. The three color developers 20Y and 20M, and 20C have application rollers 20YR, 20MR, and 20CR, respectively.

The black developer 21B is mounted detachably from the printer, and the color developers 20Y, 20M, and 20C are mounted detachably from a developing rotary 23 which rotates about a rotating shaft 22.

The sleeve 21BS of the black developer 21B is disposed at a small clearance of, for example, 300 $\mu$m against the photosensitive drum 15. The black developer 21B conveys toner by a feed member built in the developer and applies charges to the toner by friction charging such that the application blade 21BB applies the toner at the outer periphery of the sleeve 21BS. The black developer 21B also applies a developing bias to the sleeve 21BS to develop the electrostatic latent image on the photosensitive drum 15 to generate a visible image on the photosensitive drum 15 by the black toner.

The three color developers 20Y, 20M, and 20C rotate as the developing rotary 23 rotates for image generation. The sleeves 20YS, 20MS, and 20CS oppose the photosensitive drum 15 at a small clearance of about 300 $\mu$m. The color developers 20Y. 20M, and 20C stop at developing positions opposite the photosensitive drum 15 to generate a visible image on the photosensitive drum 15.

In color-image generation, the developing rotary 23 rotates as the intermediate transfer member 9 makes one turn, a developing process is executed in the yellow developer 20Y, the magenta developer 20M, the cyan developer 20C, and the black developer 21B in that order, and a visible image is sequentially generated by yellow toner, magenta toner, cyan toner, and black toner while the intermediate transfer member 9 makes four turns to generate a full-color visible image on the intermediate transfer member 9.

The intermediate transfer member 9 contacts the photosensitive drum 15 and rotates as the photosensitive drum 15 rotates. In color-image generation, the intermediate transfer member 9 rotates clockwise to receive multiple transfer of four visible images from the photosensitive drum 15. During image generation, the intermediate transfer member 9 multiple-transfers the color visible image generated on the intermediate transfer member 9 to the transfer member 2 at the same time when a transfer roller 10 described later contacts the intermediate transfer member 9 and they convey the transfer member 2 in a sandwich manner. The intermediate transfer member 9 is provided at its outer periphery with a top sensor 9a and an RS sensor 9b for detecting the position of the intermediate transfer member 9 in the rotation direction and a density sensor 9 for detecting the density of the transferred toner on the intermediate transfer member 9.

The transfer roller 10 has a transfer charger supported so as to contact with and separate from the intermediate transfer member 9, and is formed by winding medium-resistance foamed elastic member around a metal shaft.

The transfer roller 10 is separated from the intermediate transfer member 9 at a lower position so as not to disturb a visible color image, as shown by a solid line in FIG. 4, while the visible color image is multiple-transferred on the intermediate transfer member 9. After the visible, four-color image is generated on the intermediate transfer member 9, the transfer roller 10 is moved upwards as shown by a dotted line in the figure by a cam member (not shown) in synchronization with the timing when the visible color image is transferred to the transfer member 2. With this operation, the transfer roller 10 contacts the intermediate transfer member 9 by pressure through the transfer member 2 by a predetermined pressing pressure. A bias voltage is applied to the transfer roller 10 to transfer the visible color image generated on the intermediate transfer member 9 to the transfer member 2.

The fixing section 25 fixes the transferred visible color image while conveying the transfer member 2, and is provided with a fixing roller 26 for heating the transfer member 2 and a pressure-applying roller 27 for making the fixing roller 26 contact the transfer member 2 by pressure. The fixing roller 26 and the pressure-applying roller 27 are hollow and have heaters 28 and 29 inside, respectively. In other words, the transfer member 2 having the visible color image is fed by the fixing roller 26 and the pressure-applying roller 27, and toner is fixed on the surface of the transfer member 2 by heat and pressure.

The transfer member 2 on which the visible image has been fixed is discharged by sheet discharging rollers 34, 35, and 36 to a sheet discharging section 37, and the image generation operation is terminated.

Cleaning means removes toner remaining on the photosensitive drum 15 and the intermediate transfer member 9. Used toner obtained after the visible image generated on the photosensitive drum 15 by toner is transferred to the intermediate transfer member 9, and used toner obtained after the visible four-color image formed on the intermediate transfer member 9 is transferred to the transfer member 2 are accumulated in the cleaner container 14.

A transfer member (recording sheet) 2 on which an image is to be printed is taken out from a sheet feeding tray 1 by a sheet feeding roller 3 and conveyed by the intermediate transfer member 9 and the transfer roller 10 in a sandwich manner, a color toner image is recorded on the transfer member 2, and the toner image is fixed when the transfer member 2 passes through the fixing section 25. For single-sided printing, a guide 38 makes a convey path so as to guide the recording sheet to the upper sheet discharging section. For both-sided printing, the guide 28 makes a convey path so as to guide the recording sheet to a lower both-sided-printing unit.

A recording sheet sent to the both-sided-printing unit is first fed below the tray 1 (convey path indicated by a two-dot chain line) by a convey roller 40 and then conveyed in the reverse direction to a both-sided-printing tray 39. The recording sheet is placed on the both-sided-printing tray 39 upside down as compared with when the sheet was placed on the sheet feeding tray 1, and the top and bottom of the recording sheet are also reversed in the convey direction. A toner image is again transferred to the recording sheet and fixing is again executed to implement both-sided printing.

Figure 5:
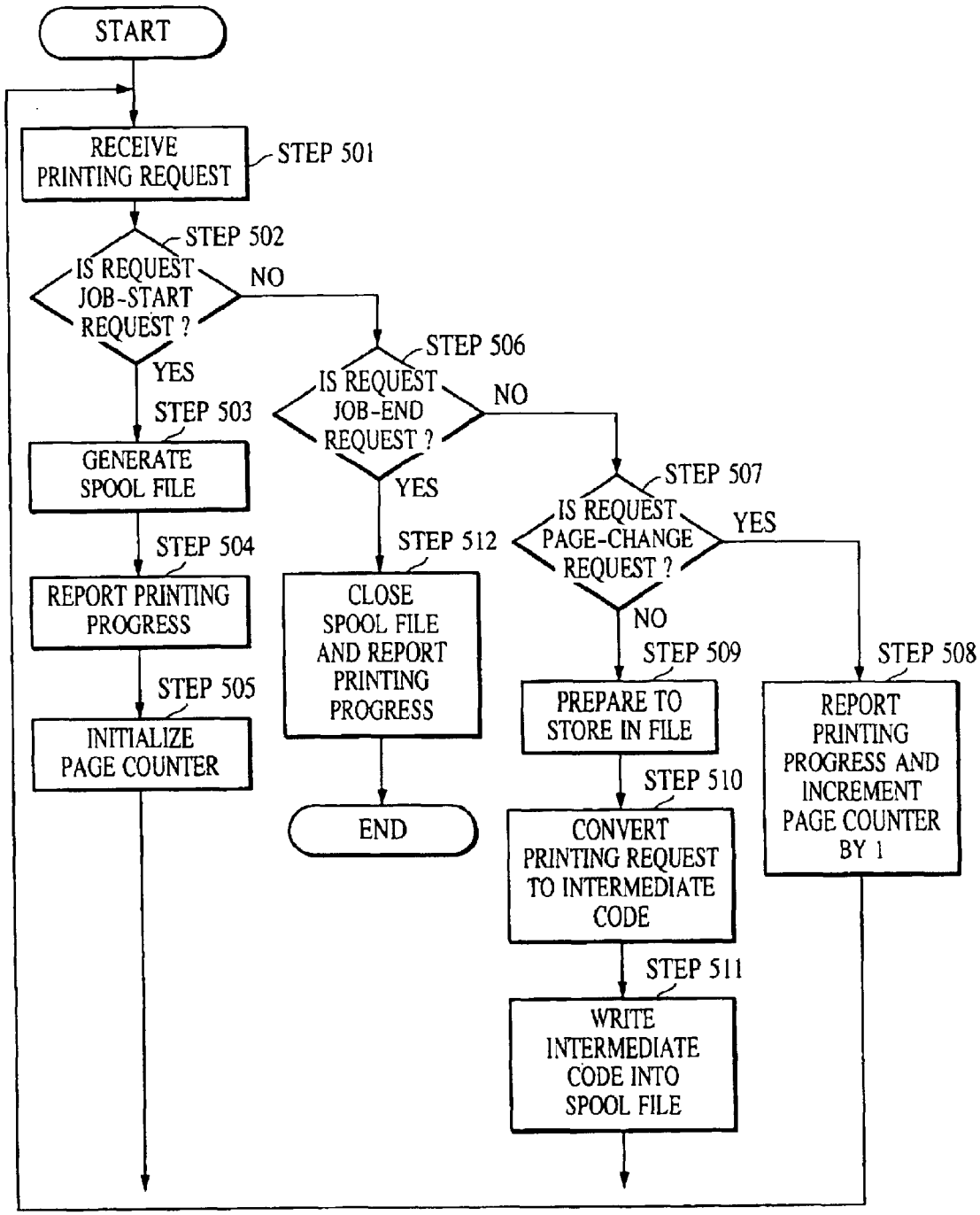
FIG. 5 is a flowchart of processing executed in an spooler 302.

FIG. 5 is a flowchart of processing in steps for storing in units of pages during the generation of the spool file 303 by the spooler 302.

Figure 8:
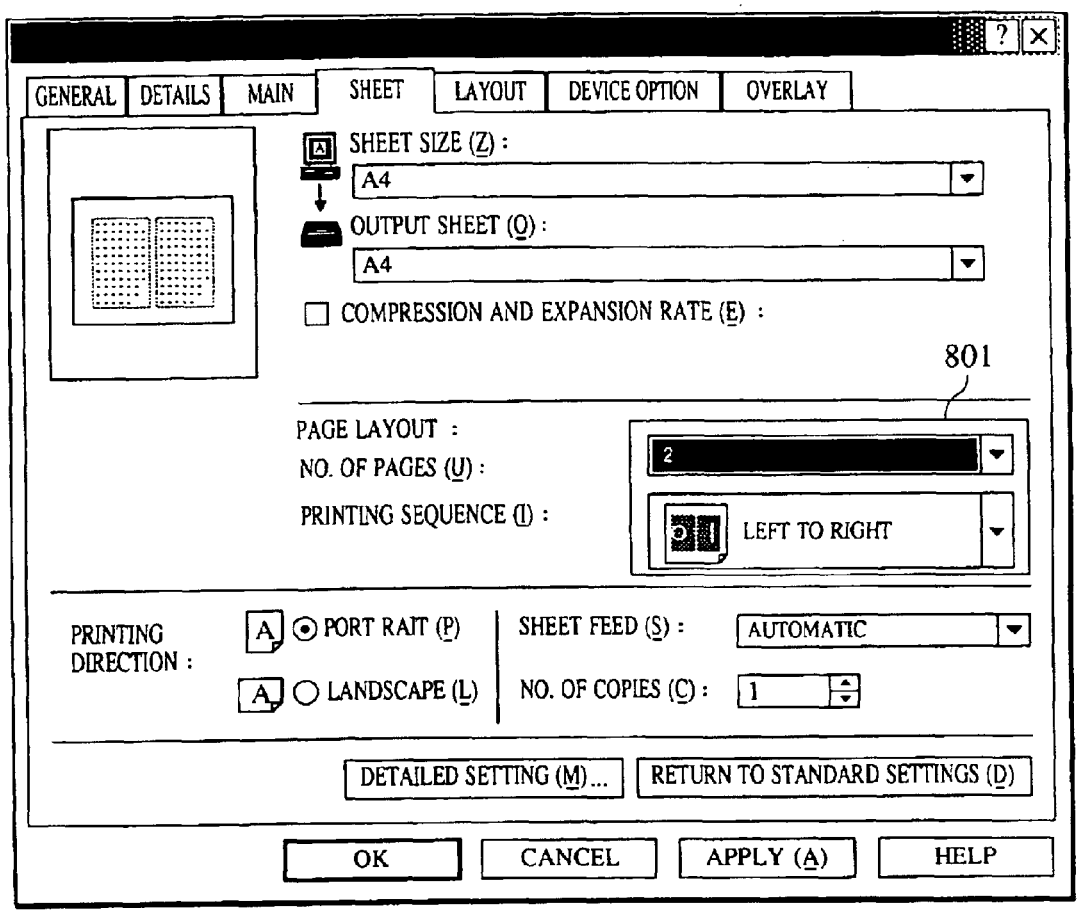
FIG. 8 shows an example of a printing-setting screen.

In a step 501, the spooler 302 receives a printing request sent from the application program through the graphic engine 202. The application program displays a dialog box for inputting printing settings, as shown in FIG. 8, and printing settings specified in the dialog box is sent to the spooler 302 by the printer driver. The setting-input dialog box shown in FIG. 8 includes setting items, such as the number of logical pages arranged in one physical page, indicated by 801.

In a step 502, the spooler 302 determines whether the received printing request is a job-start request. When it is determined in the step 502 that the request is a job-start request, the processing proceeds to a step 503, and the spooler 302 generates a spool file 303 for temporarily storing intermediate data. Then, in a step 504, the spooler 302 reports the progress of printing processing to the spool-file manager 304. In the following step 505, the spooler 302 initializes its page-number counter to 1. The spool-file manager 304 reads the job information and the manipulation settings of the job for which printing has started, from the spool file 303 and stores them.

When it is determined in the step 502 that the request is not a job-start request, the processing proceeds to a step 506.

In the step 506, the spooler 302 determines whether the received request is a job-end request. When the spooler 302 determines that the request is not a job-end request, the processing proceeds to a step 507 and the spooler 302 determines whether the request is a page-change request. When the spooler 302 determines in the step 507 that the request is a page-change request, the processing proceeds to a step 508, and the spooler 302 reports the progress of printing processing to the spool-file manager 304. Then, the spooler 302 increments the page-number counter, closes a page description file storing the intermediate code, and generates a new page description file.

When the spooler 302 determines in the step 507 that the request is not a page-change request, the processing proceeds to a step 509, and the spooler 302 prepares to write the intermediate code into a page description file.

In the next step 510, the spooler 302 converts the DDI function of the printing request to the intermediate code in order to store the printing request in the spool file 303. In a step 511, the spooler 302 writes the printing request (the intermediate code) converted to a storable form in the step 510 into the page description file of the spool file 303. Then, the processing returns to the step 501, and the spooler 302 receives a printing request sent from the application program again. This series of processes from the step 501 to the step 511 is repeated until the spooler 302 receives a job-end request (End Doc) from the application program. At the same time, the spooler 302 obtains information, such as manipulation settings, stored in the DEVMODE structure member from the printer driver 203, and stores it in the spool file 303 as a job setting file. When the spooler 302 determines in the step 506 that the printing request sent from the application program is a job-end request, since printing requests sent from the application program are finished, the processing proceeds to a step 512, and the spooler 302 reports the progress of printing processing to the spool-file manager 304 and the processing is terminated.

Figure 6:
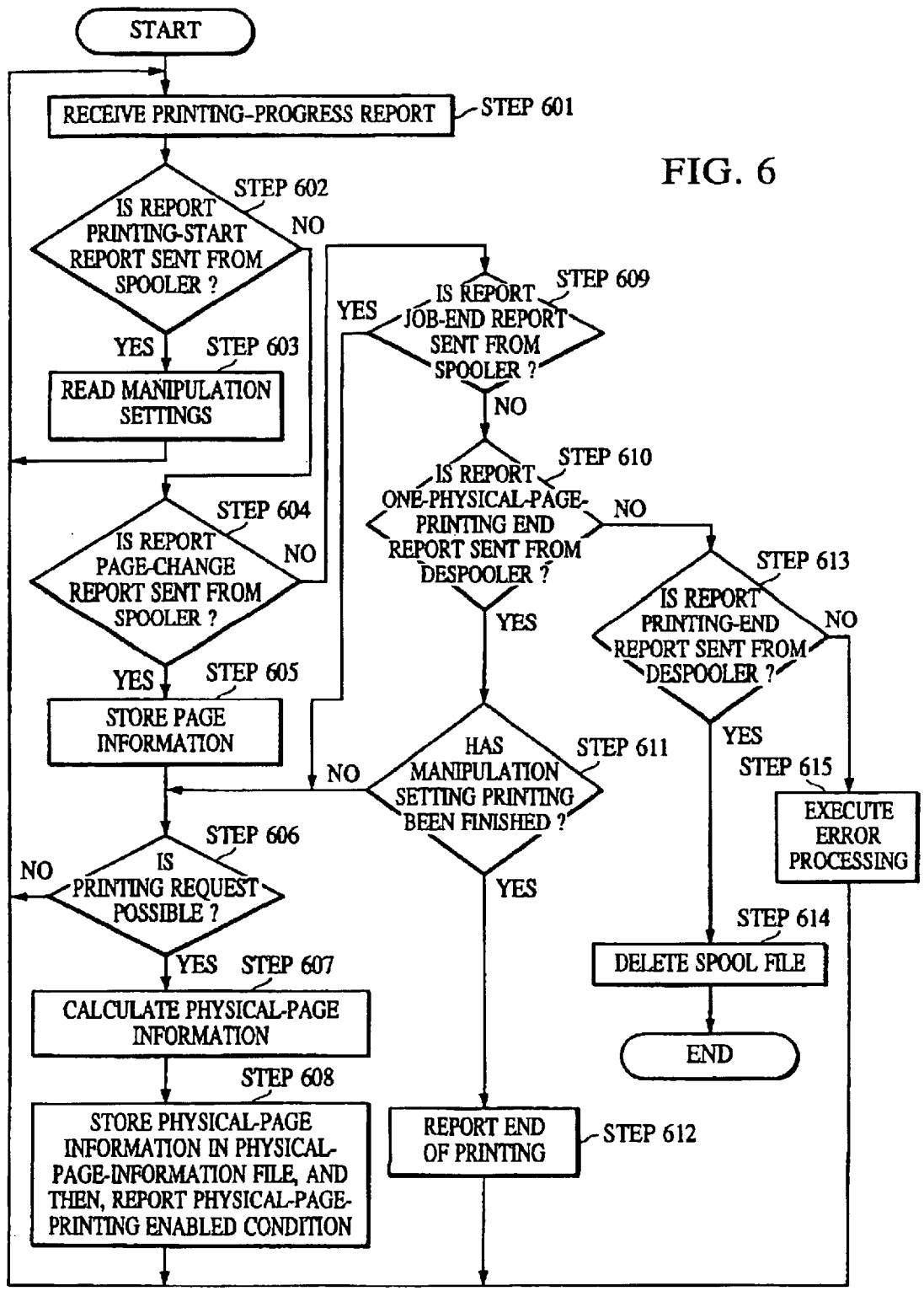
FIG. 6 is a flowchart of printing control executed in a spool-file manager 304.

FIG. 6 is a flowchart of the detailed control between a spool-file generation process and a printing-data generation process, described below, in the spool-file manager 304.

In a step 601, the spool-file manager 304 receives the report of the progress of printing processing, sent from the spooler 302 or the despooler 305.

In a step 602, the spool-file manager 304 determines whether the progress report is a printing-start report sent from the spooler 302 in the step 504. When the spool-file manager 304 determines that the progress report is a printing-start report, the processing proceeds to a step 603, and the spool-file manager 304 reads the manipulation settings of printing from the spool file 303 and starts managing the job. When the spool-file manager 304 determines in the step 602 that the progress report is not a printing-start report, the processing proceeds to a step 604, and the spool-file manager 304 determines whether the progress report is a one-logical-page printing-end report sent by the spooler 302 in the step 508. When the spool-file manager 304 determines that the progress report is a one-logical-page printing-end report, the processing proceeds to a step 605, and the spool-file manager 304 stores the logical-page information of the logical page. In the following step 606, the spool-file manager 304 determines whether one-physical-page printing can start for n logical pages for which spooling has been finished at this point of time. When the spool-file manager 304 determines that one-physicalpage printing can be started, the processing proceeds to a step 607, and a physical page number is determined from the number of logical pages assigned to one physical page to be printed.

Physical pages are calculated in the following way. When four logical pages are arranged in one physical page in a manipulation setting, for example, a first physical page is formed and becomes ready to be printed when a fourth logical page is spooled. A second physical page becomes ready to be printed when an eighth logical page is spooled.

If the total number of logical pages is not a multiple of the number of logical pages to be assigned to one physical page, logical pages to be assigned to the last physical page are determined by a spool-end report sent in the step 512.

Figure 10:
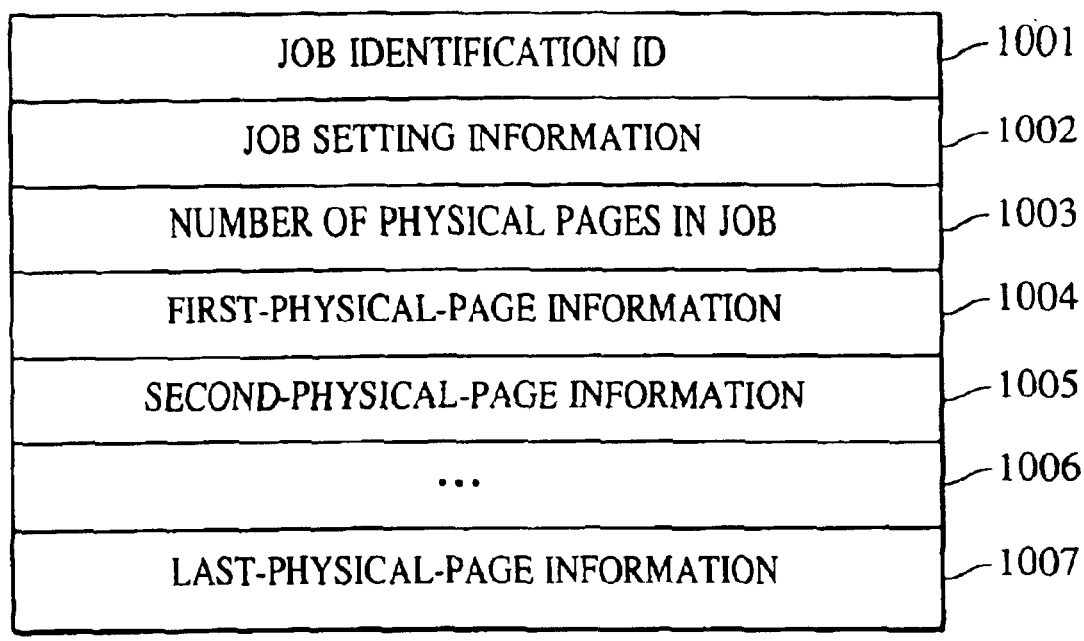
FIG. 10 is a view showing an example data format used when the spool-file manager 304 sends the printing request of a physical page to the despooler 305.

In a step 608, information, such as the numbers of logical pages constituting a physical page which becomes ready to be printed and the number of the physical page, is stored in a job-output setting file (file having physical-page information) in a format shown in FIG. 10, and the despooler 305 is informed that the physical-page information of one physical page has been added. Then, the processing returns to the step 601, and the next report is awaited. In the present embodiment, printing processing is possible when logical pages constituting one page of printing data, namely, one physical page, are spooled even if the printing job has not yet been fully spooled.

When it is determined in the step 604 that the report of progress is not a one-logical-page printing-end report sent from the spooler 302, the processing proceeds to a step 609, and the spool-file manager 304 determines whether the report is a job-end report sent from the spooler 302 in the step 512. When the spool-file manager 304 determines that the report is a job-end report, the processing proceeds to the step 606. When the spool-file manager 304 determines that the report is not a job-end report, the processing proceeds to the step 610, and the spool-file manager 304 determines whether the received report is a one-physical-page printing-end report sent from the despooler 305. When the spool-file manager 304 determines that the received report is a one-physical-page printing-end report, the processing proceeds to a step 611, and the spool-file manager 304 determines whether manipulation-setting printing has been fully finished. When the spool-file manager 304 determines that manipulation-setting printing has been fully finished, the processing proceeds to a step 612 and a printing-end report is sent to the despooler 305. When the spool-file manager 304 determines that manipulation-setting printing has not been fully finished, the processing proceeds to the step 606. It is expected in the present embodiment that the despooler 305 executes printing processing in units of physical pages. In the step 608, information required for one-physical-page printing processing is stored so that the information can be used again. If it is not necessary to use the information again, the information may be overwritten in units of physical pages into a high-speed medium such as a shared memory to save the speed and resource. When the spooling progress is faster than the despooling progress, or when despooling starts when all pages have been spooled, it is possible that a page-printing enabled condition is not reported in units of physical pages in the step 608 and the number of reporting times is reduced with a report saying that a plurality of physical pages or all physical pages are ready to be printed according to the despooling progress.

When the spool-file manager 304 determines in the step 610 that the received report is not a one-physical-page printing-end report sent from the despooler 305, the processing proceeds to a step 613, and the spool-file manager 304 determines whether the report is a printing-end report sent from the despooler 305. When the spool-file manager 304 determines that the report is a printing-end report sent from the despooler 305, the processing proceeds to a step 614 and the spool-file manager 304 deletes the corresponding page description file in the spool file 303 and terminates the processing. When the spool-file manager 304 determines that the report is not a printing-end report sent from the despooler 305, the processing proceeds to a step 615 and the spool-file manager 304 executes other usual processing and waits for the next report.

Figure 7:
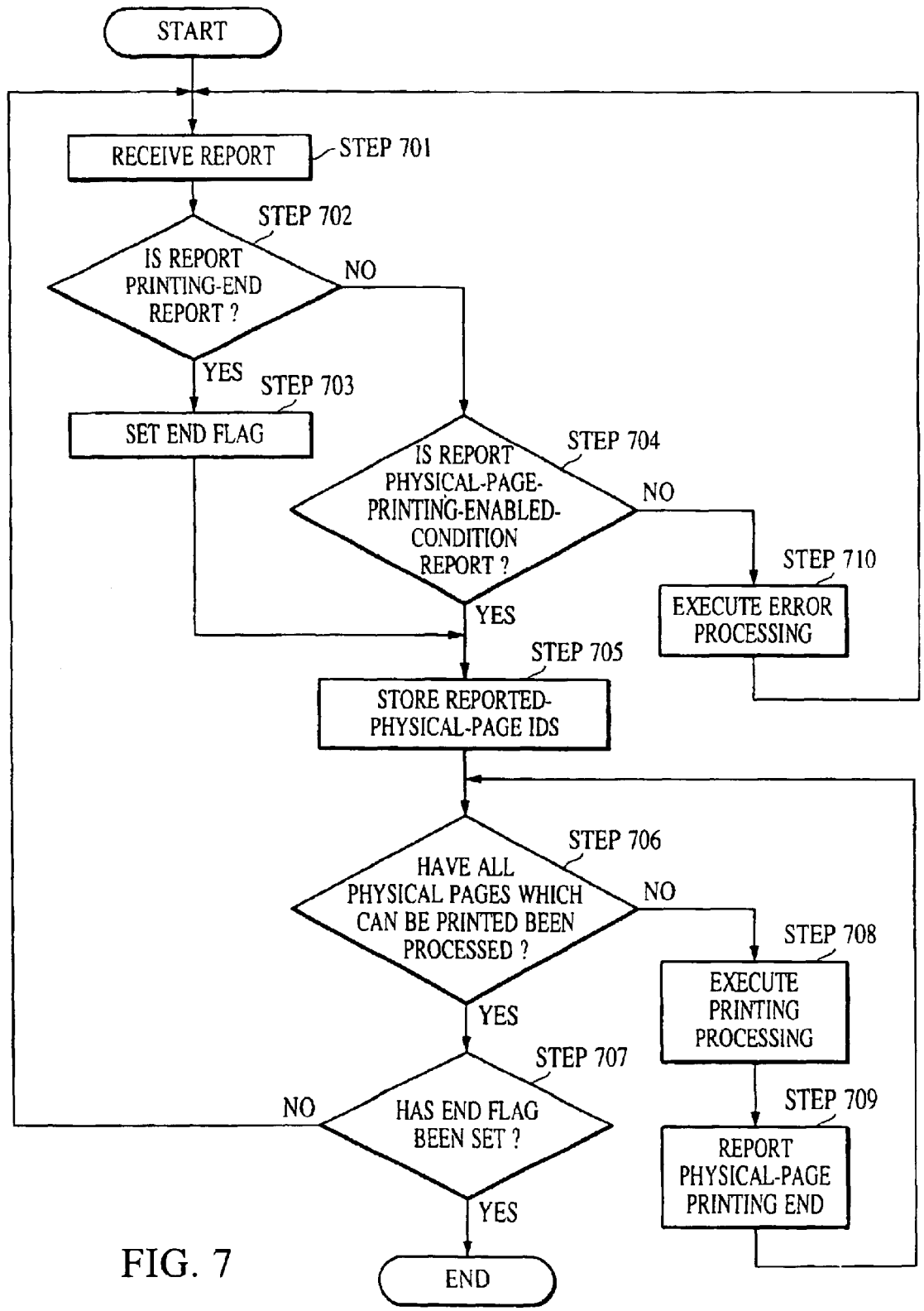
FIG. 7 is a flowchart of processing executed in a despooler 305.

FIG. 7 is a flowchart of a detailed generation process (processing) of printing data executed in the despooler 305.

The despooler 305 reads necessary information (page description file and job setting file) from the spool file 303 according to a printing request sent from the spool-file manager 304 to generate printing data. The generated printing data is transmitted to the printer as described by referring to FIG. 3.

The printing data is generated in the following way. In a step 701, the despooler 305 receives a report from the spool-file manager 304. In the next step 702, the despooler 305 determines whether the received report is a job-end report. When the despooler 305 determines that the report is a job-end report, the processing proceeds to a step 703, the despooler 305 sets an end flag, and then, the processing proceeds to a step 705. When the despooler 305 determines in the step 702 that the report is not a job-end report, the processing proceeds to a step 704, and the despooler 305 determines whether the received report is a one-physical-page printing-start request report sent in the step 608. When the despooler 305 determines that the report is not a start request report, the processing proceeds to a step 710. The despooler 305 executes an error process, the processing returns to the step 701, and the despooler 305 waits for the next report. When the despooler 305 determines in the step 704 that the report is a one-physical-page printing-start request report, the processing proceeds to the step 705, and the despooler 305 stores the ID of the printing-processing-ready physical page reported in the step 704. In the next step 706, the despooler 305 determines whether printing processing has been finished for all physical pages of which the IDs have been stored in the step 705. When the despooler 305 determines that all the physical pages have been processed, the processing proceeds to a step 707, and the despooler 305 determines whether an end flag has been set in the step 703. When the despooler 305 determines that the end flag has been set, the despooler 305 deems that the printing job has been finished, sends a processing-end report to the spool-file manager 304, and terminates the processing. When the despooler 305 determines in the step 707 that the end flag has not been set, the processing returns to the step 701 and the despooler 305 waits for the next report. When it is determined in the step 706 that a printing-ready physical page remains, the processing proceeds to a step 708, and the despooler 305 sequentially reads not-processed physical-page IDs from the stored physical-page IDs, reads information required to generate the printing data of the physical pages corresponding to the read physical-page IDs, and execute printing processing. In the printing processing, the despooler 305 converts the printing-request instruction stored in the spool file 303 into a format (GDI function) which the graphic engine 203 can recognize, and transmits it. When manipulation settings are specified such that a plurality of logical pages are arranged in one physical page, as in the present embodiment, the printing-request instruction is converted in this step with compression and arrangement being taken into account. When necessary printing processing is finished, the despooler 305 sends a one-physical-page printing-data-generation-end report to the spool-file manager 304 in the next step 709. Then, the processing returns to the step 706, and the subsequent steps are repeated until printing processing has been finished for all printing-ready-physical-page IDs stored in the step 705.

The printing-processing flow executed by the dispatcher 301, the spooler 302, the spool-file manager 304, and the despooler 305 has been described above. With the processing described above, since the application program 201 is released from printing processing at the timing when the spooler 302 generates the intermediate code and stores them in the spool file 303, it takes a shorter period of time than when the GDI function is directly output to the printer driver 203. Since intermediate files (page description file and job setting file) are temporarily stored in the spool file 303 with the printing settings of the printer driver being taken into account, the user can see a printing preview illustrating an actual print out, and printing jobs generated by a plurality of application programs can be combined or re-arranged. The user can also change printing settings without activating an application program again for printing.

In printing processing in which the spooler 302 is used, a job-output setting file is generated when the despooler 305 sends a printing request to the graphic engine 202. A job-output setting file is also created when a preview is shown or when jobs are combined. In a single job, a job-output setting file is similar to a job setting file. In a combined job, a job-output setting file is generated according to a plurality of pieces of job setting information. A job-output setting file will be described below.

FIG. 10 shows an example of a job-output setting file which stores the information of printing-ready physical pages generated by the spool-file manager 304 in the step 608. A field 1001 stores an ID used for identifying the job, and can be the name of a file or a the name of a shared memory which stores the information. A field 1002 stores job setting information. The job setting information includes information items in each of which only one value can be specified for one job, such as a structure member required to start a printing job in the graphic engine 202, N-page printing, additional descriptions such as a page frame, the number of copies, and finishing such as stapling. The job setting information 1002 stores information required according to job functions. A field 1003 indicates the number of physical pages in the job and shows that physical-page information is stored in subsequent fields the number of which is equal to this number. Since the present embodiment employs a method for reporting the number of printing-ready physical pages, the field 1003 may be omitted. From the field 1004 to the last field, physical page information is stored in the fields the number of which is specified in the field 1003. Physical page information will be described later by referring to FIG. 12.

Figure 11:
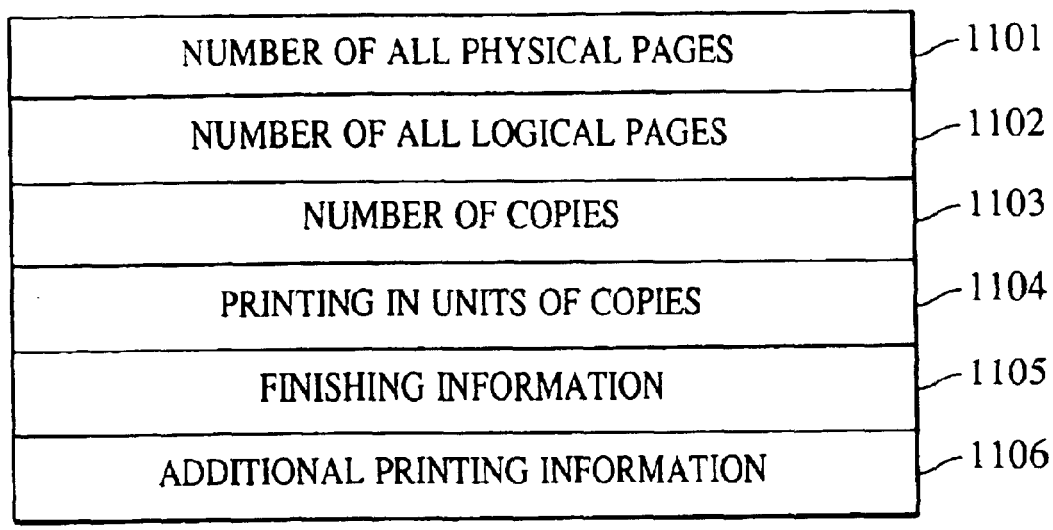
FIG. 11 is a view showing an example data format used when the spool-file manager 304 sends the printing request of a physical page to the despooler 305.

FIG. 11 is an example of the job setting information shown in the field 1002 of FIG. 10. A field 1101 indicates the number of all physical pages. A field 1002 indicates the number of all logical pages. The fields 1101 and 1102 are used when additional information such as the number of pages is printed in addition to printing data. During printing, both fields indicate tentative values. Alternatively, the spool-file manager 304 postpones the generation of printing-ready physical-page information until printing is finished. A field 1103 stores number-of-copies information specifying the number of copies to be printed in the printing job. A field 1104 stores an information item which determines whether data is printed in units of copies when the field 1103 specifies that a plurality of copies are to be printed. A field 1105 indicates finishing information, such as stapling, punching, and z-folding, and is specified when a finisher is provided for the printer or externally. A field 1106 stores additional printing information, including decorations such as a page frame, the date, and information to be added to the job, such as the user name, the number of pages, and watermark printing. As functions increase, the number of fields included in the job setting information also increases. When both-sided printing is allowed, for example, a field for specifying both-sided printing is added.

Figure 12:
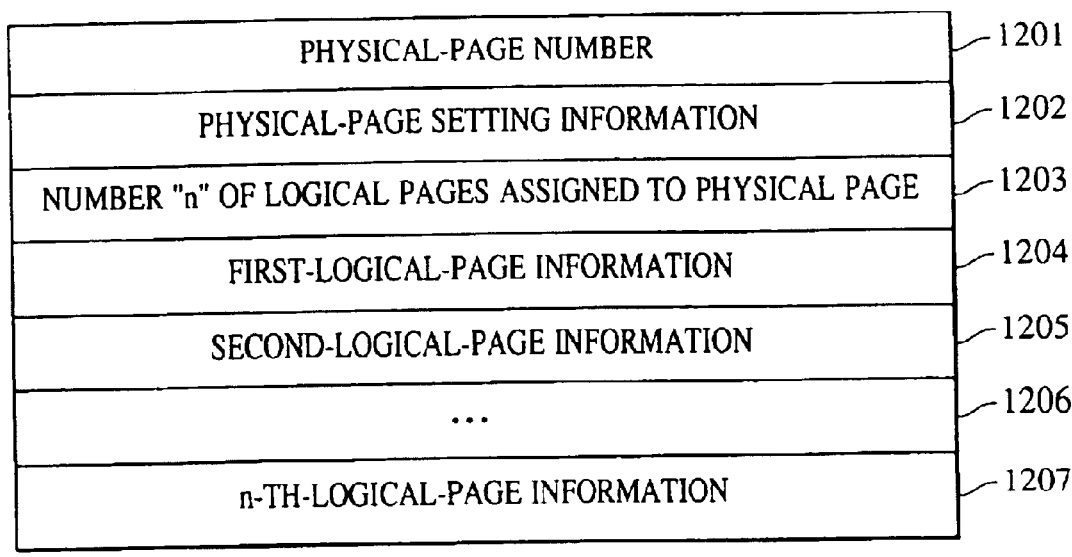
FIG. 12 is a view showing an example data format used when the spool-file manager 304 sends the printing request of a physical page to the despooler 305.

FIG. 12 shows an example of the physical page information shown in the field 1004 of FIG. 10. A first field 1201 indicates a physical-page number, and is used to manage a printing order and to additionally print the physical-page number. A field 1202 indicates physical-page setting information, and stores the settings of layout and color/monochrome printing when such settings are allowed for each physical page. A field 1203 stores the number of logical pages assigned to the physical page, and indicates 4 or an ID indicating four-page printing when four logical pages are assigned to one physical page. A field 1204 and subsequent fields store the pieces of logical-page information, the number of which is specified by the field 1203. Depending on the number of pages to be printed by the application program 201, the actual number of pages to be printed may be smaller than the number of pages specified in the field 1203. In this case, special data indicating a null page is stored as logical-page information.

Figure 13:
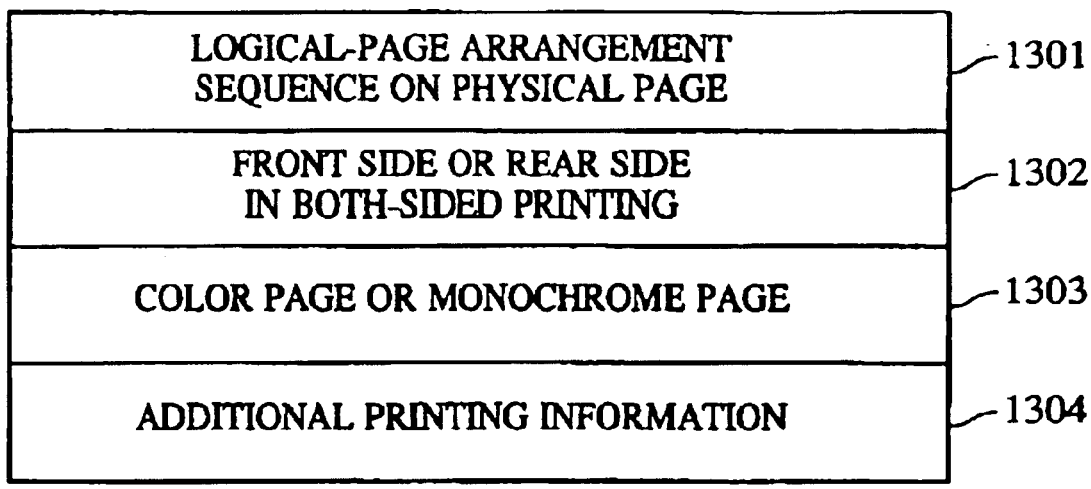
FIG. 13 is a view showing an example data format used when the spool-file manager 304 sends the printing request of a physical page to the despooler 305.

FIG. 13 shows an example of the physical-page setting information stored in the field 1202. A field 1301 indicates a logical-page arrangement sequence on a physical page, and stores how logical pages are arranged on the physical page (such as top left to right or top left to bottom) in N-page printing is specified. Depending on systems, the pieces of logical-page information may be arranged from the field 1204 not in the order of the page numbers, but in the order of the arrangement of the logical pages on a physical page, as a substitute for an arrangement-sequence setting stored in the field 1301. A field 1302 indicates the information of the front side or the rear side in both-sided printing, and is used, for example, for arranging a binding margin on both sides. A field 1303 indicates a color page or a monochrome page, and is used when a color page is printed in color mode and a monochrome page is printed in monochrome mode in a document having both color and monochrome pages by a printer having both color mode and monochrome mode. With this information, processing can be modified in a color printer in units of pages in automatic color mode. More specifically, transfer control can be achieved such that the intermediate transfer members (intermediate transfer drum and intermediate transfer belt) or the transfer members (transfer drum and transfer belt) rotate the number of turns corresponding to the number of colors, for example, four turns in the YMCK system, in each color page and the intermediate transfer members or the transfer members rotate one turn for black in each monochrome page. A field 1304 indicates additional printing information, and is used when additional information, such as the page number and the date, is printed on the physical page. Depending on the functions of the system, fields may be added also for physical-page setting information.

Figure 14:
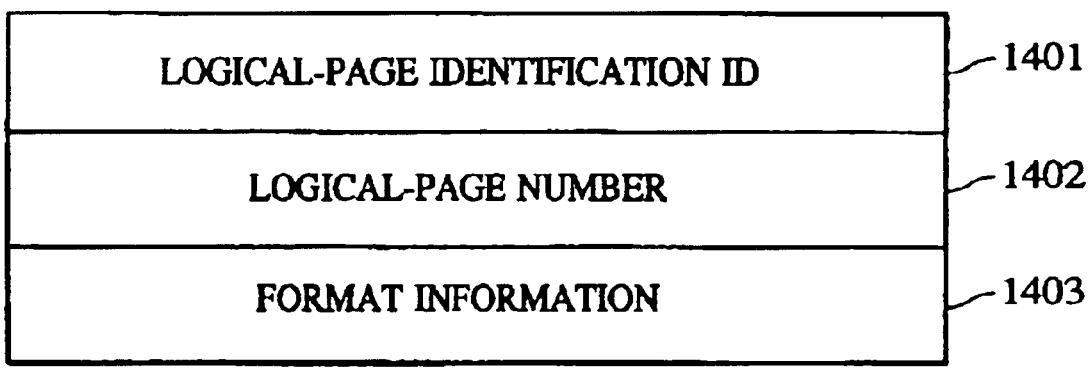
FIG. 14 is a view showing an example data format used when the spool-file manager 304 sends the printing request of a physical page to the despooler 305.

FIG. 14 shows an example of the logical-page information indicated in the field 1204. A field 1401 indicates the ID of a logical page, and is used to refer to the intermediate code of the page description file corresponding to the logical page in the spool file 303. This ID is used to access the intermediate code of the logical page. Therefore, the ID may be a file or a memory pointer, or the intermediate code of the logical page. A field 1402 indicates a logical-page number, and is used when the logical-page number is printed as additional information or used as auxiliary information of the logical-page ID. A field 1403 indicates format information, and stores various setting items which can be specified in units of logical pages. For example, additional printing information such as a page frame or various setting information specified for each logical page, such as a compression and expansion rate, are stored. If necessary, the attribute information of the logical page, such as color/monochrome information specified in units of logical pages, can also be stored. Conversely, in a system which does not switch settings in units of logical pages or which does not require attribute information specified in units of logical pages, the field 1403 is unnecessary.

The job-output setting file is configured as described above. A job setting file has a similar structure, and includes a printing form (single-sided, both-sided, or booklet printing), a printing layout (Nup, poster printing), additional information (watermark, date, user name), the number of copies, and sheet-size information. It also includes the arrangement sequence of logical pages, the front side or the rear side in both-sided printing, and a color mode for each physical page.

In FIG. 3, the setting-change editor 307 having a job-setting-change function is provided in addition to the extended system described above. In the present embodiment, job-setting contents are included in the job setting file in a single job. Job-setting contents are included in the job-output setting file shown in FIG. 10 in a combined job, and the file is independent from the page description file 303 which stores the intermediate code. Therefore, the job-setting contents can be changed by re-generating the job-output setting file. The setting-change editor 307 re-generates the job-output setting file or rewrites a part thereof by itself or in cooperation with the spool-file manager 304 to implement the job-setting-change function.

Figure 15:
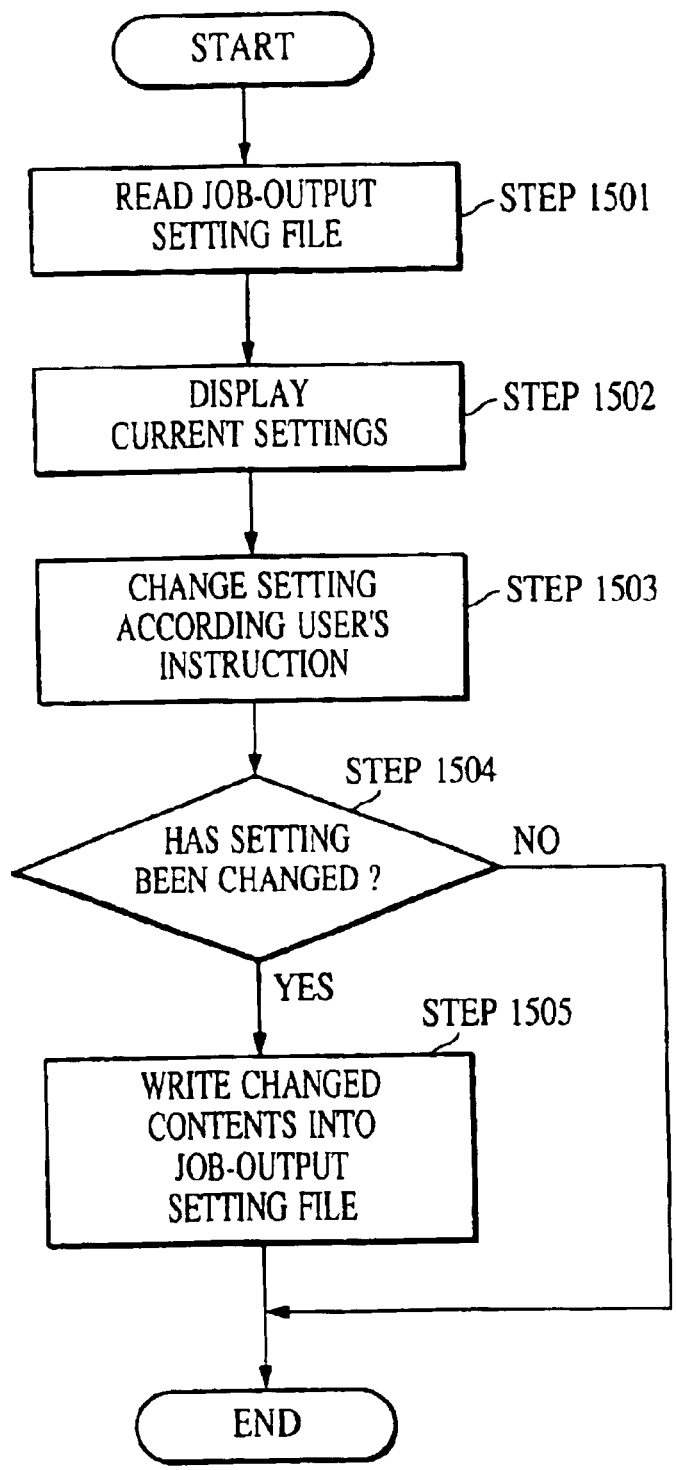
FIG. 15 is a flowchart showing setting-change processing executed in a setting-change editor 307.

FIG. 15 is a flowchart of a detailed job-setting-change process (processing) executed by the setting-change editor 307.

In a step 1501, the setting-change editor 307 reads a job setting file or a job-output setting file. The job-output setting file is the same as that read by the previewer 306 and the despooler 305. Then, the processing proceeds to a step 1502, and the read file is displayed to the user. In a step 1503, the setting-change editor 307 executes interaction with the user by a user interface shown in FIG. 18, and changes setting contents according to the menu specified by the user. Without using an interaction form, this step may employ a batch form in which the setting contents are changed according to setting-change contents written in a file. Then, the processing proceeds to a step 1504, and the setting-change editor 307 determines whether the contents read first in the step 1501 differs from the current setting contents. When the first read contents have been changed, the processing proceeds to a step 1505, and the setting-change editor 307 generates a new job-output setting file, reports the change to the spool-file manager, and terminates the processing. When it is determined in the step 1505 that the first read contents have not been changed, the setting-change editor 307 reports to the spool-file manager that no change has occurred and terminates the processing. The new job-output setting file is thus generated. When the user selects an "OK" button on the user interface screen shown in FIG. 18, the new job-output setting file is made effective and the old job-output setting file is deleted. When a change is made not to a job-output setting file but to the job setting file of a single job, the old job setting file is not deleted but stored. When the user selects a "return to initial state" button on the screen shown in FIG. 18, the new job-output setting file is deleted, and the old job-output setting file is made effective and displayed. In the present embodiment, the setting-change editor 307 serves as an independent module. The setting-change editor 307 may be a part of the user interface of the spool-file manager 304. The system may be configured such that the setting-change editor 307 does not actually write setting-change contents into the job-output setting file but reports only them to the spool-file manager 304, and the spool-file manager 304 changes the job-output setting file.

In FIG. 3, the extended system, which combines a plurality of printing jobs into one printing job and executes printing, is shown. How a combined job is despooled and previewed will be described below.

A job setting file, which is an intermediate-format spool file 303, is generally formed for each job. For a single job, since the intermediate code of each logical page in a job file to be processed is sequentially read and processed, the logical-page ID stored in the field 1401 can be a relative or absolute offset indicating the position of each logical page in the file. For a combined job, it is necessary to identify the spool file and the page information belonging to the job from the job ID stored in the field 1001. In the present embodiment, an ID used for identifying the spool file is added to the logical-page ID to identify the spool file. In this case, only the field 1401 needs to be changed. This is because pages are read in the same logical way as for a single job when the spool file is identified. When the spool file is stored as a separate file for each logical page, the logical-page ID stored in the field 1401 can be the file name of the logical page.

An embodiment of the present invention in the above-described printing system will be described next.

According to the above-described printing system, a plurality of documents for which an application program executes printing can be printed as one job. Therefore, a plurality of documents can be collectively printed in N-page printing, or a plurality of documents can be stapled or arranged in a booklet-printing format (the page order is changed and two pages are printed on each of both sides so as to have a book form when folded at the center). Effective outputs are obtained, which cannot be acquired when each document is printed.

Figure 19:
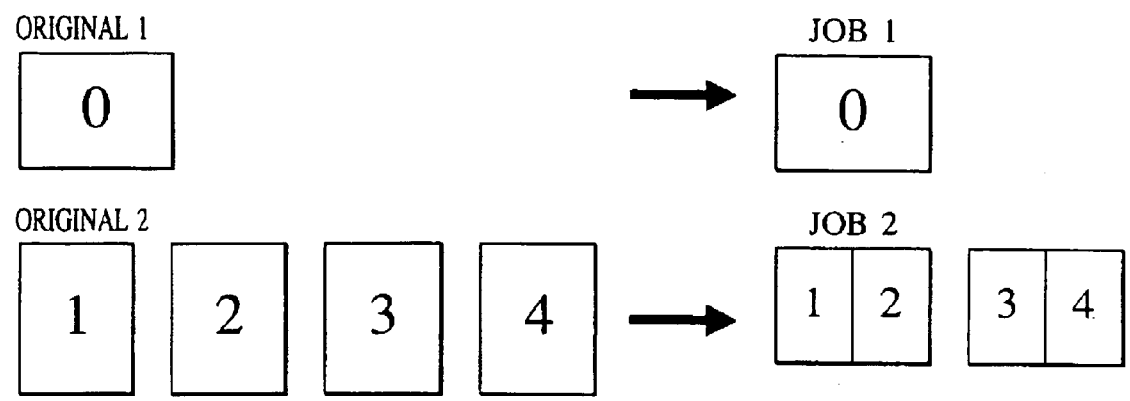
FIG. 19 is a view showing layout applied to originals.

FIG. 19 shows an example. A job 1 is to print an original 1 (one A4 landscape page) at an layout setting of one-page printing. A job 2 is to print an original 2 (four A4 portrait pages) at an layout setting of two-page printing. A layout setting is specified in the user interface (UI) of the printer driver shown in FIG. 9 when a document is printed.

Figure 20:
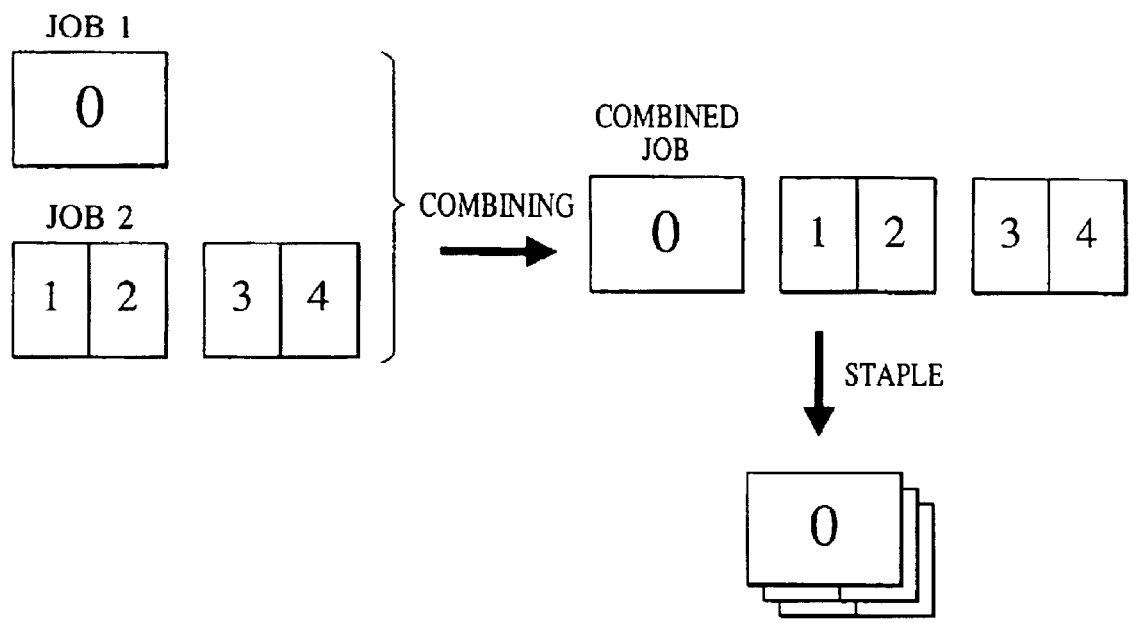
FIG. 20 is a view showing how jobs having different types of layout are combined.
Figure 21A:
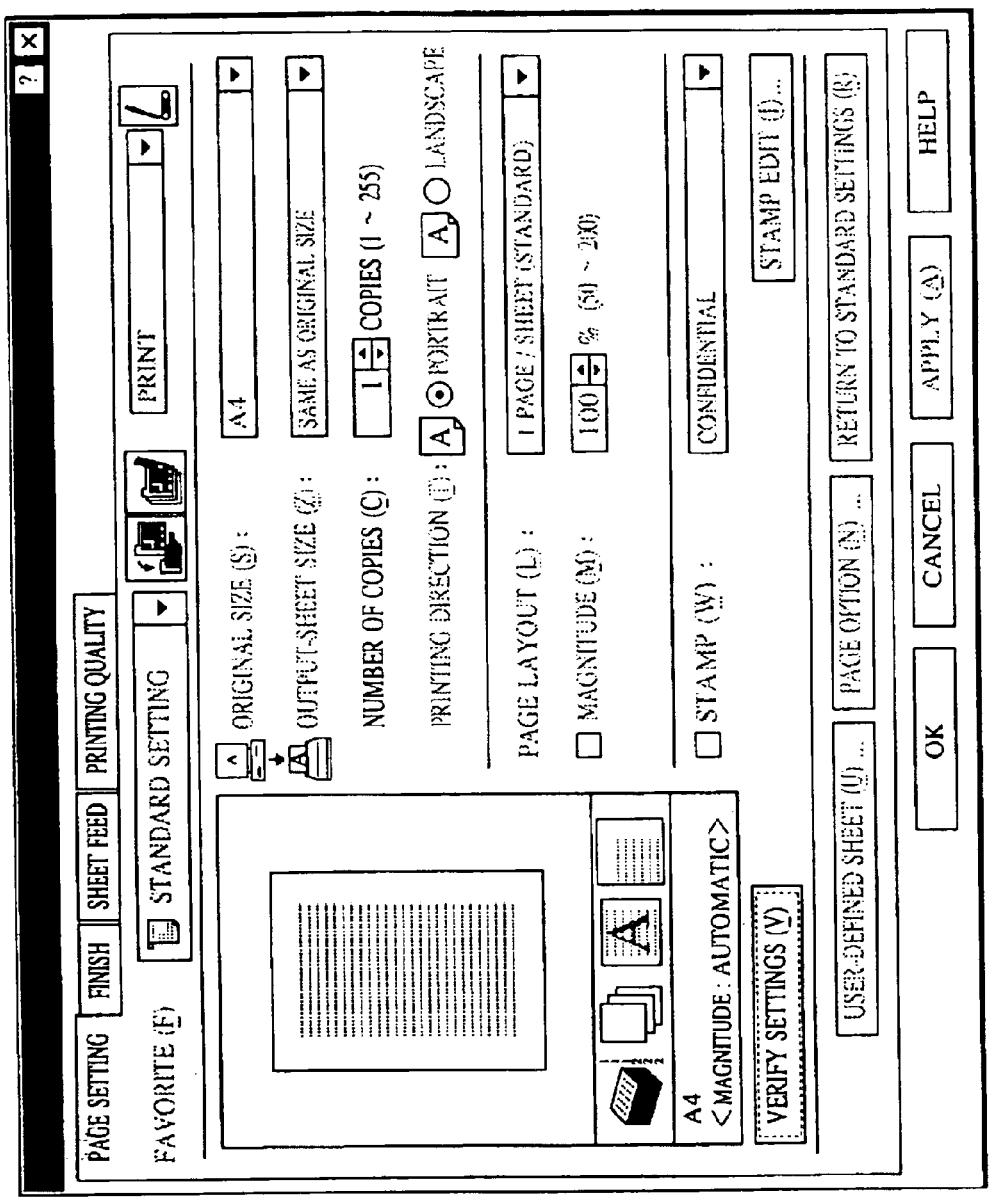
FIG. 21A to FIG. 21C are views showing the user interface of a printer driver, for which a change of layout settings is disabled.
Figure 21B:
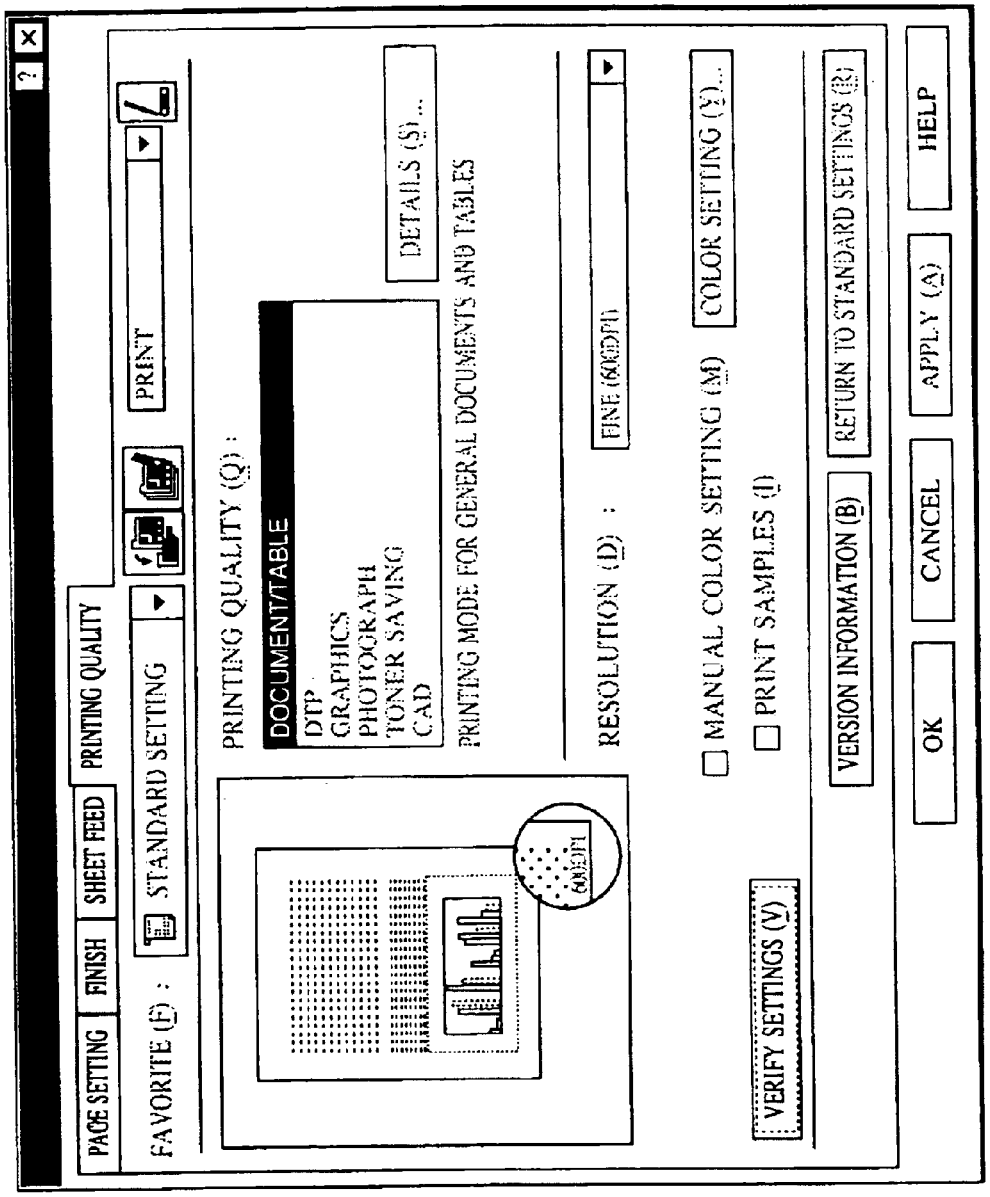
Figure 21C:
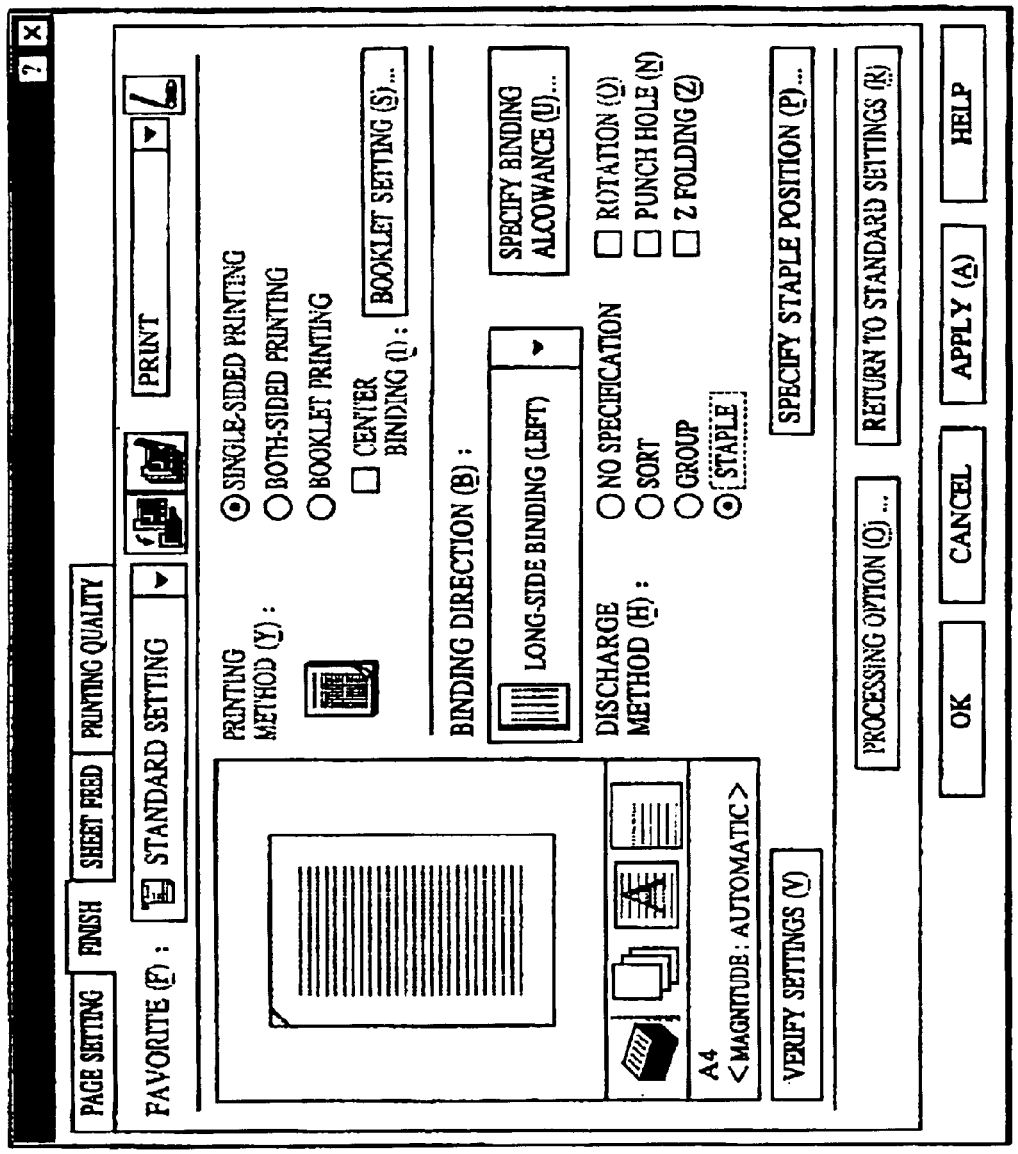

When these two jobs are combined with their layout settings-being made effective as shown in FIG. 20, all pages are printed on A4 landscape physical sheets and this printing result is suited to finishing processing such as stapling. In this case, the small preview on the editing screen (FIG. 18) of the combined printing job illustrates the combined job shown in FIG. 20, "apply layout" in FIG. 18 is not made enabled, and "page layout" and "job-boundary setting" are grayed out and cannot be selected. A "detailed settings" button is effective, and printing settings can be changed by using the user interface of the printer driver. When finishing settings are specified while the layout settings of each job is made effective by using the user interface of the printer driver, if the user interface shown in FIG. 9 is used, page-layout settings are applied to the combined job and the same layout settings are applied to all pages. In the present invention, however, when the user interface of the printer driver is used in such conditions, restrictions are applied as shown in FIG. 21A and FIG. 21B such that printing settings mainly related to layout, including page layout, and printing settings related to printing quality are made disabled (grayed out so that they cannot be selected), and printing settings related to finishing are enabled (can be selected) and displayed on a display section as shown in FIG. 21C.

Figure 22:
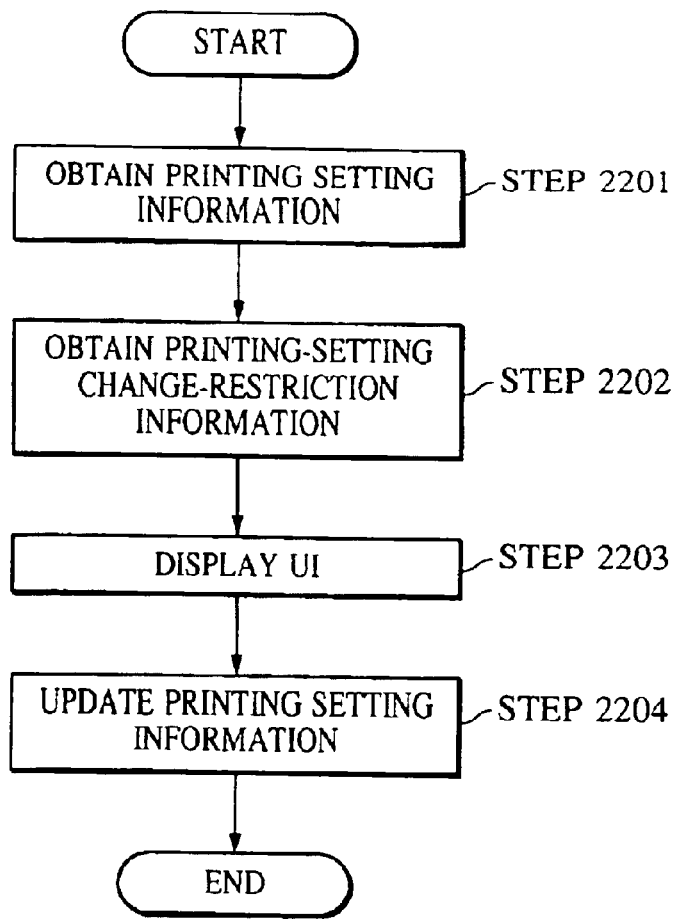
FIG. 22 is a flowchart showing processing executed in the user interface of the printer driver.

FIG. 22 is a flowchart of the user interface processing of the printer driver. Two jobs, a job 1 and a job 2, are stored in the window of the spool-file manager 304, shown in FIG. 16, and the setting-change editor 307, shown in FIG. 18, is activated to combine the two jobs. As shown in FIG. 18, a staple setting can be specified in this window. It is necessary, however, to press the "detailed setting" button to activate the user interface of the printer driver and to specify settings there in order to execute detailed settings of a staple position and other finishing settings. When the "detailed settings" button is pressed, the processing shown in FIG. 22 starts.

In a step 2201, the user interface of the printer driver obtains printing setting information from the setting-change editor 307. The printing setting information includes all setting items provided for the user interface of the printer driver, shown in FIG. 9. The printing setting information is stored in the spool file 303 for each job by the spooler 302 as job setting information. When the "detailed settings" button is pressed while a logical page of the job 1 is selected in the small preview shown in FIG. 18, the setting-change editor 307 reads the printing setting information of the job 1 from the spool file 303 and sends it to the user interface of the printer driver. In the same way, when the "detailed settings" button is pressed while a logical page of the job 2 is selected in the small preview shown in FIG. 18, the setting-change editor 307 reads the printing setting information of the job 2 from the spool file 303 and sends it to the user interface of the printer driver.

Figure 23:
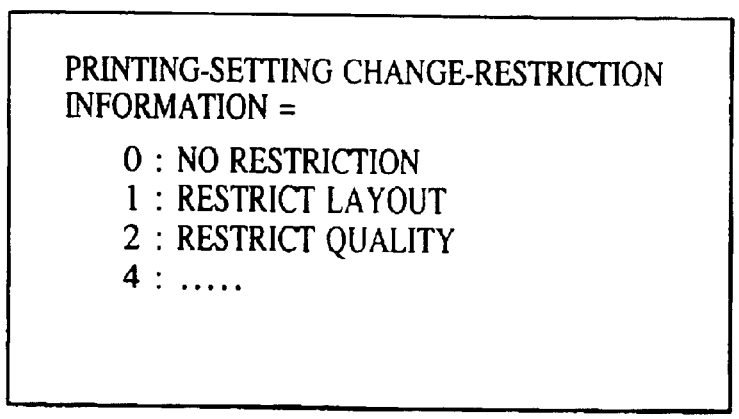
FIG. 23 is a view showing setting-change restriction information.

In a step 2202, setting-change restriction items are obtained. The setting-change editor 307 can specify all restricted items for each setting of the user interface. In the printing system, however, to make a printer driver having a different user interface operable, restriction information is specified by parameters shown in FIG. 23. Each of these restricted items is expressed by one bit, and therefore, restriction can be made by a combination of the items.

When each original shown in FIG. 19 is printed, since restriction is not placed on the user interface, printing-setting change-restriction information indicates 0. In contrast, when the "detailed settings" button is pressed to specify "staple" in the combined job shown in FIG. 20, the printing-setting change-restriction information indicates 1. It may be not preferred that settings related to printing quality be changed for a job converted into the intermediate code. Therefore, in the case of FIG. 20, a flag 1 and a flag 2 are set in some cases. The printing-setting change-restriction information is 3 in this case.

In a step 2203, the user interface is displayed according to the printing-setting information received from the setting-change editor 307, the user-interface items for which a change is to be restricted corresponding to the printing-setting change-restriction information are read from its own information data for each type (not shown), and the items for which a change is to be restricted and is displayed on the user interface are grayed out to be unable to be changed. When the flag 1 is set, setting items related to layout are grayed out to be unable to be changed, as shown in FIG. 21A. When the flag 2 is set, setting items related to printing quality are set unable to be changed, as shown in FIG. 21B, in the same way. As shown in FIG. 21C, since setting items related to finishing can be changed, stapling and other settings are possible.

In a step 2204, the printing setting information received from the setting-change editor 307 is updated according to setting changes applied on the user interface by the user, and the setting-change editor 307 obtains the updated information. The setting-change editor 307 updates the preview screen according to the updated printing setting information by the above-described method. When layout settings for each job are read from the physical-page information of the job-output setting file shown in FIG. 10 to FIG. 12 and applied, the printing setting information can be changed without changing the layout attribute of each job.

Figures 24, 25:
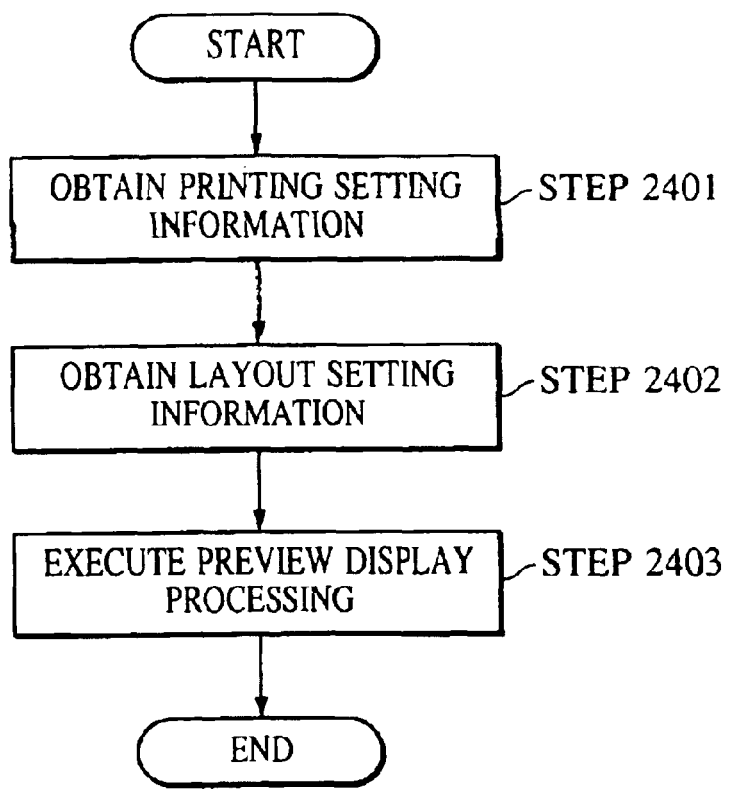
FIG. 24 is a flowchart of processing for applying changed layout information to a preview.
FIG. 25 is an example interface for extracting layout-setting information from printing-setting information.

FIG. 24 is a flowchart of processing for obtaining information used for changing a preview, from printing setting information.

In a step 2401, the setting-change editor 307 obtains the printing setting information updated by the user interface of the printer driver in the step 2204. In a step 2402, the setting-change editor 307 extracts layout setting information (information of settings to be applied to a preview) from the received printing setting information. The extracted information includes two types of information. One is information related to layout processing (hereinafter called layout processing at the host computer) which the spool-file manager 304 uses the despooler 305 to execute, and the other is information related to layout processing (hereinafter called layout processing at the printer) executed by a printing apparatus such as the printer. The layout setting information can be extracted by directly referring to the contents of the printing setting information. To operate this printing system even with a printer driver having printing setting information in a different format, the contents of the printing setting information is not directly referred to, but an interface for extracting the layout setting information from the printing setting information is provided for the printer driver. FIG. 25 shows an example interface. The setting-change editor 307 specifies information to be obtained, by setting a flag in iMode (in this case, since the layout information of both host computer and printer is to be obtained, iMode is set to 3), sets a pointer, pDevMode, to the printing setting information, including the layout setting information, and calls a GetLayoutInfo function provided by the printer driver. The printer driver writes the information specified by iMode into the memory area specified by pInfo. The setting-change editor 307 obtains the layout setting information by referring to the contents of the buffer specified by pInfo. The setting-change editor 307 updates the physical-page information shown in FIG. 10 to FIG. 12 according to the obtained information related to the layout processing at the host computer. When information related to the layout processing at the printer is obtained, a data area having the same structure as the physical-page information shown in FIG. 10 to FIG. 12 is prepared for the preview, and the layout processing at the printer is applied to the physical-page information obtained after the layout processing at the host computer and stored in the data area.

In a step 2403, the preview is executed according to the two types of layout setting information.

When the layout processing at the host computer is only specified, the previewer 306 and the setting-change editor 307 apply the same processing as the layout processing which the spool-file manager 304 executes during printing through the physical-page information shown in FIG. 10 to FIG. 12 by using the despooler 305, to the screen to generate the preview of the layout processing at the host computer. When the layout processing at the printer is also executed, the previewer 306 and the setting-change editor 307 generate a preview according to the physical-page information file for the preview in the same way to display the preview which includes the layout processing at both the host computer and the printer, on the screen.

The present invention may be applied to a system formed of a plurality of units (such as a host computer, an interface unit, a reader, and a printer), or may be applied to an apparatus (a copier, a printer, or a facsimile apparatus) formed of one unit.

An object of the present invention is also achieved when a system or a computer (or CPU or MPU) of an apparatus reads and executes a program code of software which implements the functions described in the above embodiment, the program code being stored in a storage medium.

In this case, the program code itself, which is read from the storage medium, implements the functions of the above-described embodiment. Therefore, an object of the present invention is achieved through the provision of a storage medium storing the program code.

As storage media for storing the program code, for example, a floppy disk, a hard disk, an optical disk, a magneto-optical disk, a CD-ROM, a CD-R, magnetic tape, a non-volatile memory card, a DVD, and a ROM can be used.

The present invention includes not only a case in which the computer reads and executes the program code to implement the functions of the above-described embodiment, but also a case in which the operating system (OS) running on the computer performs the whole or a part of actual processing according to the instructions of the program code to implement the functions of the above-described embodiment.

The present invention also includes a case in which the program code read from the storage medium is written into a memory provided for a function extension board inserted into the computer or a function extension unit connected to the computer, and a CPU provided for the function extension board or the function extension unit performs the whole or a part of actual processing according to the instructions of the program code to implement the functions of the above-described embodiment.

An object of the present invention is also achieved when the program code of software which implements the functions of the above-described embodiment is installed into a system or a computer (or CPU or MPU) of an apparatus and the installed program code is read and executed.

In this case, the program code itself, which is downloaded, for example, through the Internet and installed, implements the functions of the above-described embodiment, and therefore the present invention includes the program code itself.

A program code which is installed into a computer to implement the functions of the present invention by the computer is also included in the present invention. In other words, the computer program for implementing the functions of the present invention is also specified in a claim of the present invention.

The computer program is supplied in many ways. The computer program may be stored in an FD or a CD-ROM, read by a computer, and installed into the computer. The computer program itself or a file which includes a compressed version of the computer program and has an automatic installation function may be downloaded through the Internet from a web site which provides the program or the file, by a browser of a client computer. The computer program may be supplied such that the program code constituting the computer program is divided into a plurality of files and each file is downloaded from a different web site. In other words, a WWW server from which a plurality of users download the program files for implementing the functions of the present invention by a computer is also included in the present invention.

It is also possible that the computer program is enciphered, stored in a storage medium such as an FD, and distributed to users; only the users who satisfy a predetermined condition download key information required for decipherment through the Internet from a web site; and the users execute the enciphered program with the use of the key information to install it into computers.

As many apparently widely different embodiments of the present invention can be made without departing from the spirit and scope thereof, it is to be understood that the invention is not limited to the specific embodiments thereof except as defined in the appended claims.

As described above, in the present embodiment, while the printing setting attribute specified for each job is made effective, printing settings for the combined job can be changed. A printing-setting change method, a printing-setting change apparatus, and a medium for implementing printing-setting changes for jobs according to the present invention can restrict layout setting changes. A printing-setting change method, a printing-setting change apparatus, and a medium for implementing printing-setting changes for jobs according to the present invention can restrict printing-quality setting changes.

As described above, according to the present invention, since an information processing apparatus for generating printing data to be transmitted to a printing apparatus includes spool means for temporarily storing data to be printed, generated by an application program, in an intermediate-code format; setting-information obtaining means for obtaining printing-setting information from the data temporarily stored in the spool means in the intermediate-code format; display control means for controlling such that a user interface for editing the printing-setting information of the data temporarily stored in the intermediate-code format is displayed; and setting edit means for relating printing settings edited by the user interface to the data stored in the intermediate-code format and for temporarily storing them, and the display control means controls such that a change of printing settings which can be edited by the user interface is restricted and the printing settings are displayed, a change of printing settings which may cause an error in the result of printing can be restricted, and a user interface is provided with which the user can change printing settings without causing problems even if the user does not have a special knowledge.

The information processing apparatus may be configured such that it further includes job combining means for combining a plurality of printing jobs temporarily stored in the spool means for the data to be printed, converted to the intermediate-code format, into one job, and the user interface can edit printing settings for the combined job. Therefore, even when temporarily stored printing jobs are combined to one printing job, a user interface which allows the printing settings of the combined job to be edited, which conventionally cannot be allowed, can be provided to the user.

The display control means may control such that a second user interface for editing layout settings, which are printing settings for which editing is restricted, for each combined job is displayed. Therefore, layout can be changed for the whole combined job.

The printing settings for which editing is restricted by the display control means may include printing settings related to printing quality. Therefore, even when an application program which sends data dependent on a device generates printing data, since a change of printing quality is restricted, the result of printing does not have an error.

The information processing apparatus may be configured such that it further includes restriction-information obtaining means for obtaining the restriction information of printing settings, and the display control means restricts a change of printing settings which can be edited by the user interface, according to the restriction information. Therefore, the restriction information can be changed for each printing job, and the degree of freedom in changing printing settings after spooling is increased.

The information processing apparatus may further include printing-data generation means for generating printing data to be transmitted to the printing apparatus, according to the data temporarily stored in the spool means in the intermediate-code format. Therefore, even when printing settings are changed, printing data can be generated without instructing printing again from the application program.

The information processing apparatus may further include description-instruction generation means for converting the data temporarily stored in the spool means in the intermediate-code format into description instructions which the description means of the operating system can interpret and for outputting the instructions, and printing-instruction allocation means for passing a printing instruction received from the application program through the description means of the operating system, to the spool means, and for passing a printing instruction received from the description-instruction generation means through the description means of the operating system, to the printing-data generation means. Therefore, the application program is released from output processing earlier when printing is instructed. In addition, since printing is executed through the description means of the operating system after editing, it is unnecessary to provide the printing-data generation means and a special interface used when edited data is output. Conventional printing-data generation means can be used, and therefore, loads imposed on a developing process is reduced.

The information processing apparatus may be configured such that the description instructions are graphic-driver-interface (GDI) functions, the printing instructions are device-driver-interface (DDI) functions, and the printing data is written in a printer language. Therefore, an operating system usually used can be employed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for generating printing data to be transmitted to a printing apparatus, comprising:

spool means for temporarily storing data to be printed in an intermediate-code format with print setting information designated via a user interface by a printer driver, wherein the data to be printed is generated by an application program and said spool means stores a plurality of print jobs;

setting-information obtaining means for obtaining the print setting information from the data temporarily stored in said spool means in the intermediate-code format;

display control means for controlling to display a user interface for editing print setting information of a print job generated by combining the plurality of print jobs stored in said spool means;

setting edit means for relating the print setting information of the print job generated by combining the plurality of print jobs and edited by the user interface to the data of the plurality of print jobs stored in the intermediate-code format and for temporarily storing them; and print job generation means for generating a combined print job described in a page description language based on the data of the plurality of print jobs stored in said spool means in the intermediate-code format and the edited print setting information, wherein said display control means controls to restrict print setting items which cannot be edited as part of the combined job and to display the other print setting items as available print setting items which can be edited as part of the combined job, and wherein a default value of the available print setting items is a display value of the print setting information which can be edited.

2. An information processing apparatus according to claim 1, wherein when editing print setting information of the combined print job, said display control means displays a setting relating to a layout as the setting item, which cannot be edited, in the user interface by restricting editing in the case of not applying the layout, and when editing the print setting information of a single print job stored in said spool means, said display control means displays the setting relating to the layout as the item which can be edited in the user interface.

3. An information processing apparatus according to claim 1, wherein said display control means controls such that a second user interface for editing layout settings of each combined job is displayed, wherein the editing layout settings are print settings in which editing is restricted.

4. An information processing apparatus according to claim 1, wherein the print settings for which editing is restricted by said display control means includes print settings related to printing quality.

5. An information processing apparatus according to claim 1, further comprising restriction obtaining means for obtaining restriction information of the print settings, wherein said display control means restricts a change in the print settings, which can be edited by the user interface, according to the restriction information.

6. An information processing apparatus according to claim 1, further comprising printing-data generation means for generating printing data to be transmitted to the printing apparatus, according to the data temporarily stored in said spool means in the intermediate-code format.

7. An information processing apparatus according to claim 6, further comprising:
   first printing instruction generation means for converting the data temporarily stored in said spool means in the intermediate-code format into first printing instructions which can be interpreted by an operating system description means for outputting second printing instructions; and
   printing-instruction allocation means for communicating a second printing instruction received from the application program through the operating system description means to said spool means, and for communicating a second printing instruction received from said first printing instruction generation means through the operating system description means to said printing-data generation means.

8. An information processing apparatus according to claim 7, wherein the first printing instructions are graphic device interface functions, the second printing instructions are device-driver-interface functions, and the printing data is written in a printer language.

9. An information processing method for generating printing data to be transmitted from an information processing apparatus to a printing apparatus, said method comprising:
   an intermediate-data conversion step, of converting data to be printed into data having an intermediate-code format with print setting information designated via a user interface by a printer driver and temporarily storing the converted data in spool means, the data to be printed being generated by an application program and the spool means stores a plurality of print jobs;
   a setting-information obtaining step, of obtaining the print setting information from the data temporarily stored in the spool means in the intermediate-code format;
   a display control step, of controlling to display a user interface for editing print setting information of a print job generated by combining the plurality of print jobs stored in the spool means;
   a setting edit step, of relating the print setting information of the print job generated by combining the plurality of print jobs and edited by the user interface to the data of the plurality of print jobs stored in the intermediate-code format and of temporarily storing them; and
   a print job generation step, of generating a combined print job described in a page description language based on the data of the plurality of print jobs stored in the spool means in the intermediate-code format and the edited print setting information,
   wherein said display control step includes controlling to restrict print setting items which cannot be edited as part of the combined job and to display the other print setting items as available print setting items which can be edited as part of the combined job, and
   wherein a default value of the available print setting items is a display value of the print setting information which can be edited.

10. An information processing method according to claim 9, wherein when editing print setting information of the combined print job, said display control step displays a setting relating to a layout as the setting item, which cannot be edited, in the user interface by restricting editing in the case of not applying the layout, and
   when editing the print setting information of a single print job stored in the spool means, said display control step displays the setting relating to the layout as the item which can be edited in the user interface.

11. An information processing method according to claim 9, wherein said display control step controls such that a second user interface for editing layout settings of each combined job is displayed, wherein the editing layout settings are print settings in which editing is restricted.

12. An information processing method according to claim 9, wherein the print settings for which editing is restricted in said display control step includes print settings related to printing quality.

13. An information processing method according to claim 9, further comprising a restriction obtaining step, of obtaining restriction information of the print settings,
   wherein said display control step restricts a change in the print settings, which can be edited by the user interface, according to the restriction information.

14. An information processing method according to claim 9, further comprising a printing-data generation step of generating printing data to be transmitted to the printing apparatus, according to the data temporarily stored in the intermediate-code format.

15. An information processing method according to claim 14, further comprising:
   a first printing instruction generation step, of converting the data temporarily stored in the intermediate-code format into first printing instructions which can be interpreted by an operating system description means for outputting second printing instructions; and
   a printing-instruction allocation step, of communicating a second printing instruction received from the application program through the operating system description means to the information processing apparatus spool means, and of communicating the first printing instruction generated in said first printing instruction generation step through the operating system description means to the information processing apparatus printing-data generation means.

16. An information processing method according to claim 15, wherein the first printing instructions are graphic device interface functions, the second printing instructions are device-driver-interface functions, and the printing data is written in a printer language.

17. A computer-executable program for executing a method for generating printing data to be transmitted form an information processing apparatus to a printing apparatus, said program comprising:
   code for an intermediate-data conversion step, of converting data to be printed into data having an intermediate-code format with print setting information designated via a user interface by a printer driver and temporarily storing the converted data in spool means, the data to be printed being generated by an application program and the spool means stores a plurality of print jobs;
   code for a setting-information obtaining step, of obtaining the print setting information from the data temporarily stored in the spool means in the intermediate-code format;
   code for a display control step, of controlling to display a user interface for editing print setting information of a print job generated by combining the plurality of print jobs stored in the spools means;
   code for a setting edit step, of relating the print setting information of the print job generated by combining the plurality of print jobs and edited by the user interface to the data of the plurality of print jobs stored in the intermediate-code format and of temporarily storing them; and code for a print job generation step, of generating a combined print job described in a page description language based on the data of the plurality of print jobs stored in the spool means in the intermediate-code format and the edited print setting information, wherein said display control code controls to restrict print setting items which cannot be edited as part of the combined job and to display the other print setting items as available print setting items which can be edited as part of the combined job, and wherein a default value of the available print setting items is a display value of the print setting information which can be edited.

18. An computer-executable program according to claim 17, wherein when editing print setting information of the combined print job, said code for a display control step displays a setting relating to a layout as the setting item, which cannot be edited, in the user interface by restricting editing in the case of not applying the layout, and when editing the print setting information of a single print job stored in the spool means, said code for a display control step displays the setting relating to the layout as the item which can be edited in the user interface.

19. A computer-executable program according to claim 17, wherein said display control step controls such that a second user interface for editing layout settings of each combined job is displayed, wherein the editing layout settings are print settings in which editing is restricted.

20. A computer-executable program according to claim 17, wherein the print settings for which editing is restricted by said display control program code includes print settings related to printing quality.

21. A computer-executable program according to claim 17, further comprising code for a restriction obtaining step, of obtaining restriction information of the print settings, wherein said display control step restricts a change in the print settings, which can be edited by the user interface, according to the restriction information.

22. A computer-executable program according to claim 17, further comprising a printing-data generation program code of generating printing data to be transmitted to the printing apparatus, according to the data temporarily stored in the intermediate-code format.

23. A computer-executable program according to claim 22, further comprising:

code for a first printing instruction generation step, of converting the data temporarily stored in the intermediate-code format into first printing instructions which can be interpreted by an operating system description means for outputting second printing instructions; and code for a printing-instruction allocation step, of communicating a second printing instruction received from the application program through the operating system description means to the information processing apparatus spool means, and of communicating the first printing instruction in said first printing instruction generation step through the operating system description means to the information processing apparatus printing-data generation means.

24. A computer-executable program according to claim 23, wherein the first printing instructions are graphic device interface functions, the second printing instructions are device-driver-interface functions, and the printing data is written in a printer language.

25. A storage medium for storing a computer-readable program for executing a method of generating printing data to be transmitted from an information processing apparatus to a printing apparatus, said program comprising:

code for an intermediate-data conversion step, of converting data to be printed into data having an intermediate-code format with print setting information designated via a user interface by a printer driver and temporarily storing the converted data in spool means, the data to be printed being generated by an application program and the spool means stores a plurality of print jobs;

code for a setting-information obtaining step, of obtaining the print setting information from the data temporarily stored in the spool means in the intermediate-code format;

code for a display control step, of controlling to display a user interface for editing print setting information of a print job generated by combining the plurality of print jobs stored in the spools means;

code for a setting edit step, of relating the print setting information of the print job generated by combining the plurality of print jobs and edited by the user interface to the data of the plurality of print jobs stored in the intermediate-code format and of temporarily storing them; and code for a print job generation step, of generating a combined print job described in a page description language based on the data of the plurality of print jobs stored in the spool means in the intermediate-code format and the edited print setting information, wherein said display control code controls to restrict print setting items which cannot be edited as part of the combined job and to display the other print setting items as available print setting items which can be edited as part of the combined job, and wherein a default value of the available print setting items is a display value of the print setting information which can be edited.

* * * * *

UNITED STATES PATENT AND TRADEMARK OFFICE
CERTIFICATE OF CORRECTION

PATENT NO. : 6,924,826 B1
DATED : August 2, 2005
INVENTOR(S) : Koji Nakagiri et al.

It is certified that error appears in the above-identified patent and that said Letters Patent is hereby corrected as shown below:

Column 17,
Line 37, "or a the" should read -- or the --.

Column 20,
Lines 51 and 53, "an" should read -- a --.

Column 28,
Line 43, "form" should read -- from --.

Column 29,
Line 14, "An" should read -- A --.

Signed and Sealed this

Twenty-third Day of May, 2006

JON W. DUDAS
*Director of the United States Patent and Trademark Office*